(12) United States Patent
Mori et al.

(10) Patent No.: US 8,087,378 B2
(45) Date of Patent: Jan. 3, 2012

(54) APPARATUS FOR COATING LENSES

(75) Inventors: Katsuhiro Mori, Shunan (JP); Naoto Takahashi, Shunan (JP); Shuhei Yamamoto, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 343 days.

(21) Appl. No.: 12/528,964

(22) PCT Filed: May 21, 2008

(86) PCT No.: PCT/JP2008/059380
§ 371 (c)(1),
(2), (4) Date: Aug. 27, 2009

(87) PCT Pub. No.: WO2008/146687
PCT Pub. Date: Dec. 4, 2008

(65) Prior Publication Data
US 2010/0089317 A1    Apr. 15, 2010

(30) Foreign Application Priority Data

May 23, 2007 (JP) ................... 2007-136788
May 23, 2007 (JP) ................... 2007-136789
May 30, 2007 (JP) ................... 2007-143040

(51) Int. Cl.
*B05B 13/02* (2006.01)
*B05B 5/00* (2006.01)
*B05C 11/02* (2006.01)

(52) U.S. Cl. .......... 118/500; 118/52; 118/612; 118/319; 118/320; 118/66; 118/642

(58) Field of Classification Search ............... 118/52, 118/612, 319, 320, 500, 56, 58, 66, 712, 118/323, 641–643; 427/164, 165; 264/1.33, 264/1.37; 425/810
See application file for complete search history.

(56) References Cited

U.S. PATENT DOCUMENTS
5,143,552 A    9/1992    Moriyama
(Continued)

FOREIGN PATENT DOCUMENTS
EP    1 947 183 A1    7/2008
(Continued)

*Primary Examiner* — Yewebdar Tadesse
(74) *Attorney, Agent, or Firm* — Birch, Stewart, Kolasch & Birch, LLP

(57) ABSTRACT

To provide a coating apparatus capable of automatically executing a series of steps of measuring the shape of a lens and applying a primer solution thereon, drying the primer solution and applying a photochromic coating solution thereon, and curing the coated solutions by the UV irradiation, liberating the operator from the work of setting the lenses piece by piece. A lens-feeding portion 2 is arranged upstream of the series of steps, the lens-feeding portion 2 having lens-holding units 22 in which a plurality of lenses are arranged straight in the horizontal direction and/or in the up-and-down direction, and a first lens sub-carrier means 31 for carrying the lenses held therein to the lens-measuring portion 3. The lens-holding unit 22 has, formed therein, a plurality of stepped lens-placing portions in concentric having diameters increasing upward, and an open portion is formed in the central portions of the plurality of lens-placing portions 20 and in a portion of the lens-placing portion on the side of the lens sub-carrier means enabling the lens-support portion of the carrier means to pass through.

16 Claims, 25 Drawing Sheets

U.S. PATENT DOCUMENTS

| | | | |
|---|---|---|---|
| 6,296,707 | B1 | 10/2001 | Adamczyk et al. |
| 7,520,936 | B2 | 4/2009 | Nagashima et al. |
| 2004/0161548 | A1 | 8/2004 | Nagashima et al. |
| 2009/0011126 | A1 | 1/2009 | Mori et al. |
| 2009/0133625 | A1 * | 5/2009 | Takahashi et al. ............ 118/712 |

FOREIGN PATENT DOCUMENTS

| | | |
|---|---|---|
| JP | 5-55427 A | 3/1993 |
| JP | 6-293434 A | 10/1994 |
| JP | 10-59453 A | 3/1998 |
| JP | 11-135427 A | 5/1999 |
| JP | 2000-334369 A | 12/2000 |
| JP | 2004-261801 A | 9/2004 |
| JP | 2005-13873 A | 1/2005 |
| JP | 2005-136319 A | 5/2005 |
| JP | 2005-246266 A | 9/2005 |
| JP | 2006-93203 A | 4/2006 |
| JP | 2007-127841 A | 5/2007 |
| WO | WO-2007/052732 A1 | 5/2007 |
| WO | WO-2007/052815 A1 | 5/2007 |
| WO | WO-2007/102330 A1 | 9/2007 |

* cited by examiner

Fig. 7
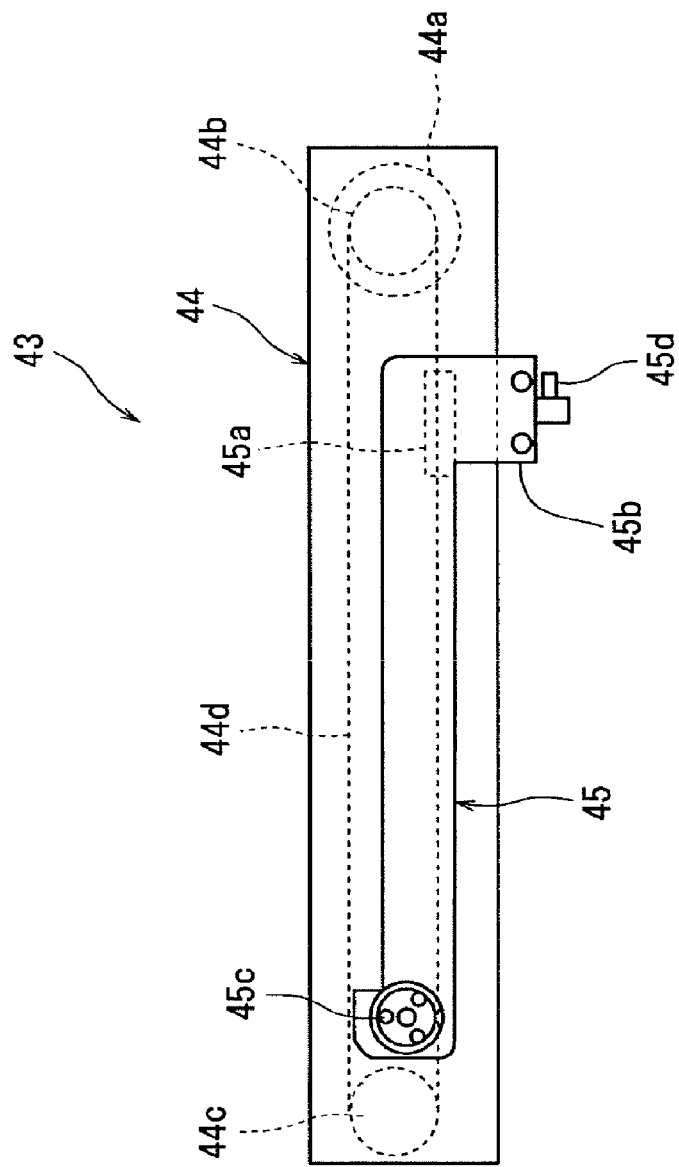
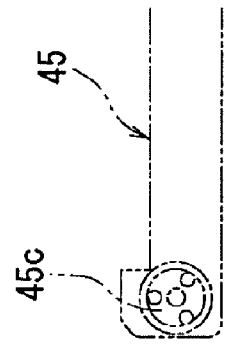

Fig. 11
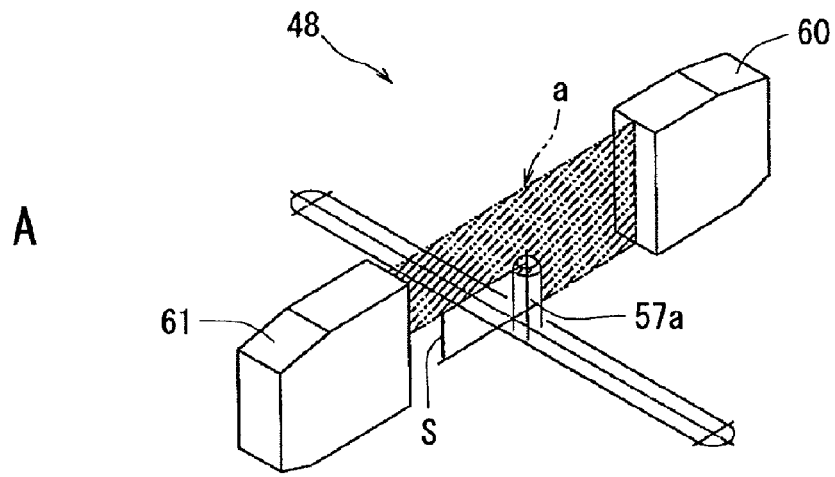
A
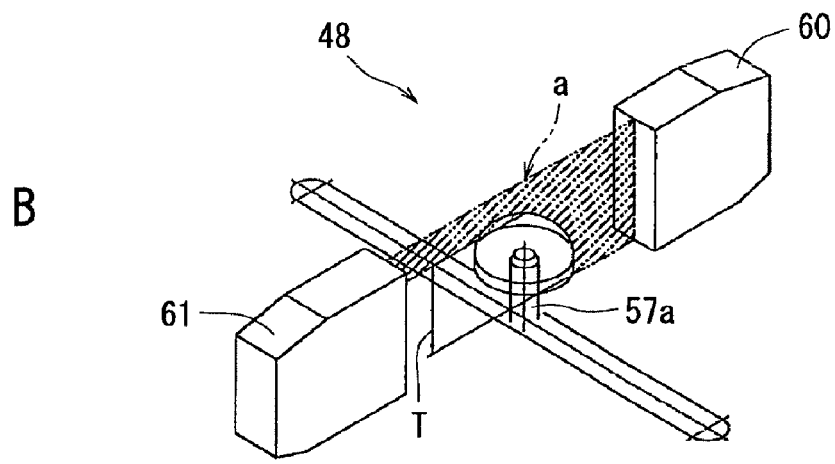
B
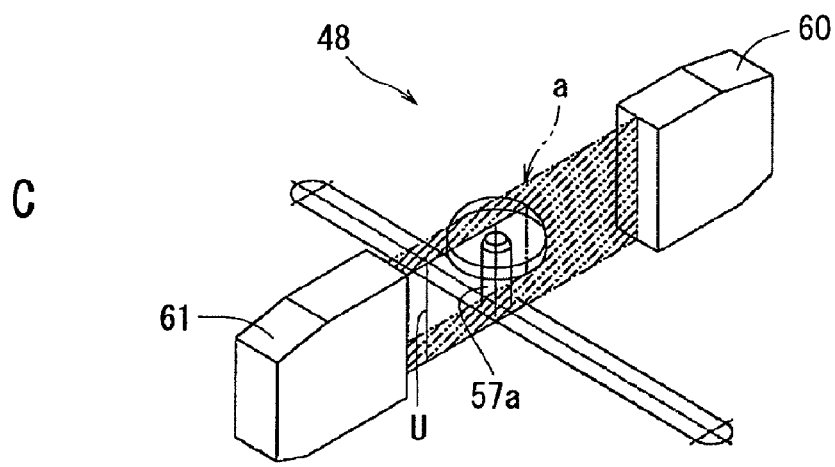
C

Fig. 12
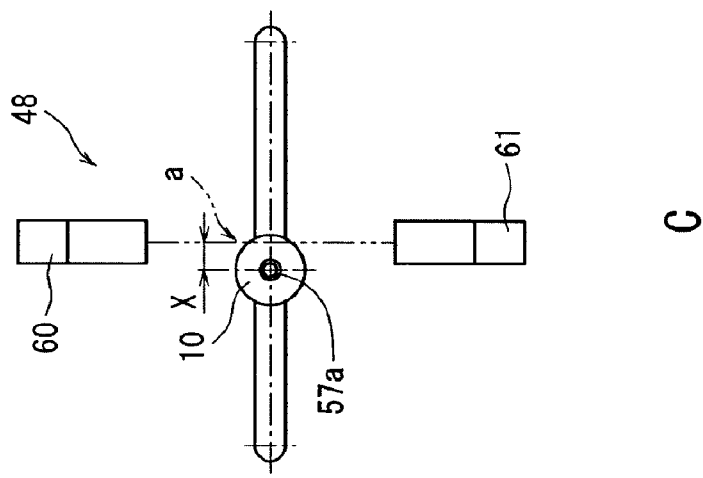
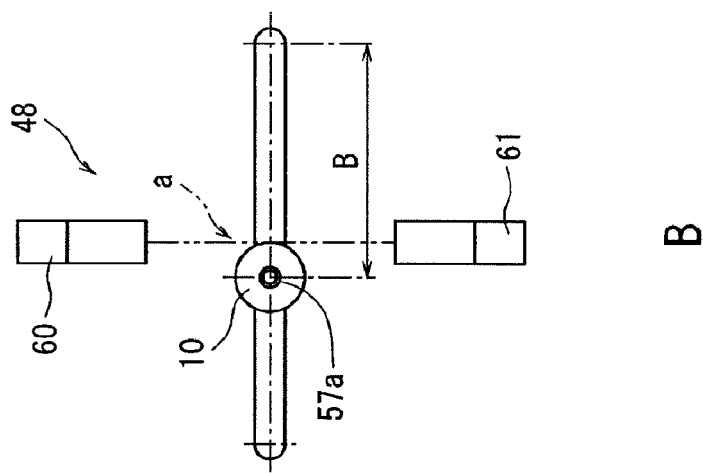
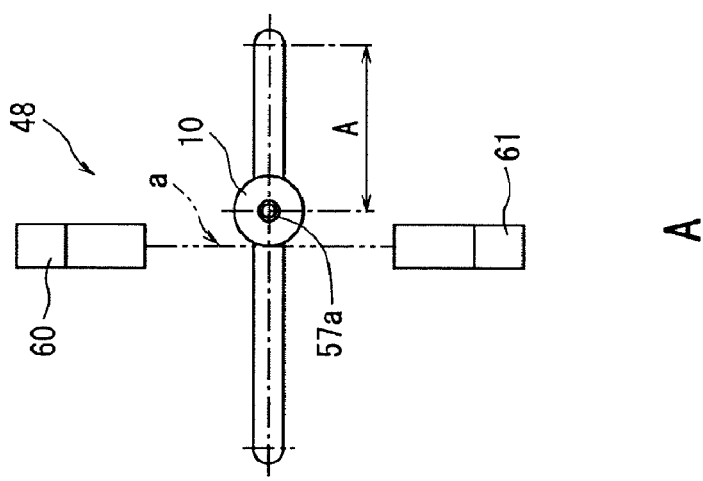

APPARATUS FOR COATING LENSES

TECHNICAL FIELD

This invention relates to a coating apparatus for forming a primer coating and a photochromic coating on lenses such as of spectacles.

BACKGROUND ART

A material that changes color depending upon the light can be represented by a photochromic material. The photochromic material reversibly varies the structure depending upon the incidence of ultraviolet rays and has a property of exhibiting varying absorption spectrum. This is the property of a material in that if an isomer is irradiated with light of a particular wavelength, the single chemical material reversibly forms another isomer having a different absorption spectrum due to the action of light. The formed another isomer resumes the color of the initial isomer due to heat or light of another wavelength.

There have been proposed photochromic spectacles using lenses that have properties of the photochromic material. Outside of a house, the photochromic spectacles quickly develop a color being irradiated with light containing ultraviolet rays such as of sunlight and works as sunglasses. Inside of the house where no light is incident, the photochromic spectacles have its color faded and works as ordinary transparent spectacles.

Lenses having photochromic properties have heretofore been produced by an automated method according to which a lens is, first, arranged by hand at a predetermined position, and the height of the lens and the radius of curvature of the lens, etc. are measured by using sensors. Before being coated with a photochromic coating solution, a primer coating is formed on the surface of the lens as a pre-treatment for the photochromic coating (hereinafter often called photochrocoating) operation in order to improve closely adhering property between the photochromic coating and the lens material. Through a series of operations such as photochro-coating and UV irradiation, a photochro-coated lens is produced by using the coating apparatus.

Therefore, the lens is handed over in a series of processings for coating the lens. In the primer-coating processing and the photochro-coating processing, the lens is subjected to the coating processings while being held by a spin shaft and being rotated about the center axis. Here, it is important that the lens is handed over without deviating the position of the center axis of the lens.

As means for easily handing the lens over to the above spin shaft, we have proposed an apparatus for carrying lenses having a U-shaped lens-holding portion (International Application PCT/JP2006/321923).

FIG. 25 shows a lens-holding portion of a U-shape developed by the present applicant as a related technology (which is not a prior art) of the invention. FIG. 25A is a plan view illustrating a state where a lens 102 supported by a spin shaft 101 is to be supported by a lens-support hand 103 provided in a unit for carrying the lens 102. In order for the lens-holding portion to stably support the lens, it is desired that an adsorbing hole 101a communicated with air adsorption means that is not shown is formed in the central portion of the spin shaft 101 to thereby support the central bottom surface portion of the lens 102 by the suction of the air. It is desired that the lens support hand 103 is provided with a U-shaped lens-support portion 103a, and that an adsorption hole 103b communicated with the air adsorption means that is not shown is formed in the lens-support portion 103a.

At the time of handing the lens 102 over, the lens-support hand 103 advances toward the spin shaft 101, and, as shown in FIG. 25B, the lens-support portion 103a is arranged just under the lens 102 bestriding the spin shaft 101. Then, the lens support hand 103 is elevated to disengage the lens 102 from the spin shaft 101. The lens-support portion 103a now supports the lens 102. Thereafter, as shown in FIG. 25C, the lens-support hand 103 is moved back. The lens is supported being adsorbed by the adsorbing hole 103b provided in the lens-support portion 103a. While the lens 102 is being carryed, therefore, it does not happen that the lens 102 is deviated or the lens 102 falls. Thus, the lens-support hand 103 carrys the lens to the next step.

To produce a lens (photochromic lens) having photochromic properties, a method (coating method) has been proposed for forming a layer (photochromic coating) having photochromic properties on the surfaces of a lens by using a coating solution containing a photochromic material. As apparatuses therefor, there have been known an apparatus capable of continuously coating a plurality of lenses (see patent document 1) and an apparatus having an auxiliary function for spreading the coating solution (see patent document 2). There has, further, been proposed a photochromic coating apparatus provided with a device for measuring lenses and is capable of forming a photochromic coating maintaining stability (see patent document 3).

Patent document 1: JP-A-2000-334369
Patent document 2: JP-A-2005-13873
Patent document 3: JP-A-2007-127841

DISCLOSURE OF THE INVENTION

Problems to be Solved by the Invention

While the lens 102 is being carryed by the lens-support hand 103, it is necessary to firmly fix the lens 102 so that its position will not be deviated or so that it will not fall. For this purpose, it is desired that the lens-support hand 103 has an adsorbing hole 103b formed in a lens-support portion 103a of a U-shape so as to support the lens 102 by the suction of the air.

There will be no problem when the lens 102 having a relatively large thickness is sucked by the adsorbing hole 103b. As shown in FIG. 25C, however, both ends 103d and 103d of the adsorbing hole 103b are positioned separated away from each other. When the lens 102 having a small thickness is to be carryed being sucked by the adsorbing hole 103b, however, a large moment is exerted on the lens 102. Therefore, the plastic lens is often distorted since its strength has been decreased upon receiving heat.

To cope with this, it can be contrived to stick a pad 104 to the bottom surface of the lens 102 as shown in FIG. 26 and to support the lens 102 via the pad 104 requiring, however, the work for sticking the pad 104 and for removing the pad 104. When it is attempted to increase the productivity, in particular, it is urged to decrease the amount of work leaving room for improvement.

As described earlier, further, once the center of the lens is arranged at first on a predetermined position by human hand, the subsequent operation is carried out automatically and, therefore, the automatically coated lenses can be produced. As the productivity becomes high, however, an increased burden is exerted on the operator still leaving room for improvement.

At the time of irradiating ultraviolet rays, further, a UV lamp generates heat. If the coated lenses are efficiently and continuously produced, therefore, the temperature of the apparatus is often elevated due to the heat. It has, on the other hand, been learned that the photochromic coating is subject to be affected by the temperature while the primer coating is subject to be affected by the temperature and humidity. In continuously coating the lenses, therefore, if the temperature of the apparatus is elevated due to the UV irradiation, it often becomes difficult to obtain coated lenses of high quality.

In the primer-coating operation, further, the primer-coating solution is applied to the lens while rotating the lens. Unlike the photochromic coating solution, however, the primer coating solution has a low viscosity and generates mist. In order to prevent the mist from adhering to the lens again, therefore, we have proposed an art of concealing the spin shaft of a primer-coating portion with a cover, forming an exhaust port in the cover and forcibly exhausting the mist from the exhaust port in International Application PCT/JP 2007/053572 (see FIG. 27, cover 91, exhaust port 91a, forced exhaust means 92, flow of mist b).

When the mist is to be forcibly exhausted at the primer coating portion as described above, the heat generated by the UV lamp may often be drawn by the primer-coating portion and the temperature of the primer-coating portion is often elevated. Further, since the mist is forcibly exhausted, the pressure becomes negative in the chamber of the coating apparatus inducing dust to infiltrate from the exterior. Therefore, the place where the coating apparatus is installed must be maintained clean to a sufficient degree. This problem becomes serious as it is attempted to increase the productivity leaving room for improvement.

The present invention, therefore, provides a method of solving the above problems and, particularly, various problems that occur when it is attempted to mass-produce the lenses.

Concretely, at the time when the spin shaft (support shaft) and the lens carrier apparatus hand the lenses over to each other, the present invention provides an apparatus for coating lenses capable of handing over or carrying the lenses without causing the lenses to be distorted while using no pad even when the lenses have small thicknesses.

The invention, further, has an object of providing an apparatus for coating lenses which does not require the operator to set the lenses piece by piece, which requires no instruction concerning the size of the lens diameter, and which greatly decreases the burden for the operator.

The invention, further, provides an apparatus for coating lenses which eliminates or decreases the effect of heat of the UV lamp and is capable of performing a high degree of coating operation maintaining a high degree of cleanness.

Upon solving the above problems, it is made possible to efficiently mass-produce the lenses of high qualities.

Means for Solving the Problems

In order to achieve the above objects, the coating apparatus of the invention comprises a coating line which includes a lens-measuring portion (3) for measuring the shape of a starting lens, a primer-coating portion (5) for applying a primer solution onto the starting lens to prepare a first intermediate product lens having an undried primer coating, a photochromic-coating portion (7) for applying a photochromic coating solution onto a second intermediate product lens obtained by drying the first intermediate product lens through a drying portion (6) to prepare a third intermediate product lens having an uncured photochromic coating, and a UV irradiation portion (8) for irradiating the third intermediate product lens with UV to cure the uncured photochromic coating to thereby prepare a product lens; and carrier means for carrying the lens to each of the portions in the coating line; wherein, means for supporting the lens in at least any one of the lens-measuring portion (3), primer-coating portion (5), photochromic-coating portion (7) or UV irradiation portion (8), is a support shaft for supporting the central bottom surface portion of the lens by air suction means;

the carrier means is provided with an adsorbing portion for supporting the central bottom surface portion of the lens by the air suction means, and the support shaft is surrounded by a lens-placing portion for supporting the bottom surface of the lens other than the regions of the lens that are supported by the support shaft and by the adsorbing portion; and the lens is temporary-placed on the lens-placing portion at the time of receiving or handing over the lens between the support shaft and the adsorbing portion, and at least any one of the lens-placing portion, support shaft or adsorbing portion is moved up and down so that the lens is supported by the support shaft or by the adsorbing portion.

In the apparatus for coating lenses, the lens-placing portion comprises three or more pin members upstanded surrounding the support shaft, and the bottom surface of the lens is supported by the ends of the pin members.

In the apparatus for coating lenses, the height of the support shaft is fixed, and the lens-placing portion and the adsorbing portion are moved up and down to receive or hand over the lens.

In the apparatus for coating lenses, the carrier means are provided in a number of two or more, and the lens-placing portion is provided for temporary-placing the lens thereon at the time when the lens is to be received or handed over among these carrier means, and the lens-placing portion supports the bottom surface of the lens other than the region of the lens supported by the adsorbing portion of the carrier means.

In the apparatus for coating lenses, the carrier means is provided with two adsorbing portions, the one adsorbing portion receiving the lens supported by the support shaft via the lens-placing portion and the other adsorbing portion handing the lens supported by the adsorbing portion over to the support shaft.

In the coating apparatus, the lens-measuring portion (3) is provided with a lens-measuring sensor for detecting the height of the central portion of the lens, the photochromic-coating device is provided with a sensor for detecting the height of the end of a nozzle of a container that feeds the photochromic coating solution, and the distance between the end of the nozzle and the central portion of the lens is adjustable to a predetermined gap.

In the apparatus for coating lenses:

the UV irradiation portion (8) is provided with the support shaft for supporting the central bottom surface portion of the third intermediate product lens by the air suction means, and a lens-holding chamber (96) that can be purged with nitrogen for irradiating the third intermediate product supported by the support shaft with ultraviolet rays;

the carrier means for carrying the lens to the UV irradiation portion (8) is provided with the adsorbing portion for supporting the central bottom surface portion of the lens by the air suction means;

the support shaft is surrounded by the lens-placing portion that supports the bottom surface of the lens other than the region of the lens supported by the support shaft and by the adsorbing portion; and at the time of receiving or handing over the lens between the support shaft and the adsorbing portion, the lens is temporary-placed on the lens-placing portion, at least any one of the lens-placing portion, support shaft or adsorbing portion is moved up and down so that the lens is supported by the support shaft or by the adsorbing portion, and after the lens is supported by the support shaft, the lens-placing portion is moved in a horizontal direction from under the lens and is arranged being separated away from the lens-holding chamber.

In the apparatus for coating lenses;

the primer-coating portion (5) is provided with the support shaft and the lens-placing portion, includes an intake duct (134) having an intake port for taking in the primer coating solution in the form of liquid or mist scattered at the time of coating, and has an adhesion-preventing member for preventing the primer coating solution from adhering on the lens-placing portion;

the intake duct (134) includes a dome-like upper cup (131) near the circumferential edge of the lens having a center opening (131a) at a position higher than the lens, and a dome-like middle cup (132) near the circumferential edge of the lens having a center opening (132a) at a position lower than the lens and maintaining a distance from the upper cup, the intake duct (134) having a exhaust port for exhausting the primer coating solution in the form of liquid or mist to the exterior;

the intake port of the intake duct (134) is formed by the center opening center opening (131a) of the upper cup (131) and by the center opening (132a) of the middle cup (132); and the adhesion-preventing member has an upper end near the circumferential edge of the center opening (132a) of the middle cup (132), and includes a cylindrical member which surrounds at least the upper end side of the lens-placing portion.

In the apparatus for coating lenses, a starting lens-feeding portion (2) is arranged at a position upstream of the coating line, the starting lens-feeding portion (2) having:

starting lens-holding units (22) in which a plurality of starting lenses are arranged straight in the horizontal direction and/or in the up-and-down direction;

a lens-adsorbing portion (45c) for supporting the bottom surface of the starting lens held in the starting lens-holding units by the suction of the air;

a moving mechanism for moving the lens-adsorbing portion (45c) back and forth, right and left, and up and down; and a first lens sub-carrier means (31) for carrying the starting lenses from the starting lens-holding units (22) to the lens-measuring portion (3).

In the apparatus for coating lenses, a product lens storage portion (9) is arranged at a position downstream of the coating line, the product lens storage portion (9) having:

product lens-holding units (75) in which a plurality of product lenses are arranged straight in the horizontal direction and/or in the up-and-down direction;

a lens-adsorbing portion (45c) for supporting the bottom surface of the product lens by the suction of the air;

a moving mechanism for moving the lens-adsorbing portion (45c) back and forth, right and left, and up and down; and a second lens sub-carrier means (73) for carrying the product lenses from the coating line to the product lens-holding units (75).

In the apparatus for coating lenses, the starting lens-holding unit (22) has, formed therein, a plurality of stepped starting lens-placing portions (25) in concentric having diameters increasing upward, an open portion is formed in the central portions of the plurality of starting lens-placing portions and in a portion of the lens-placing portion on the side of the first lens sub-carrier means (31) enabling the lens-adsorbing portion (45c) to pass through, and the lens is placed on the stepped portion.

In the apparatus for coating lenses, the product lens-holding unit (75) has, formed therein, a plurality of stepped product lens-placing portions (having the same shapes as the starting lens-placing portions (25)) (75a) in concentric having diameters increasing upward, an open portion is formed in the central portions of the plurality of product lens-placing portions and in a portion of the lens-placing portion on the side of the second lens sub-carrier means (73) enabling the lens-adsorbing portion (45c) to pass through, and the lens is placed on the stepped portion.

In the apparatus for coating lenses, the photochromic-coating portion (7) is partitioned, and temperature-adjusting means is provided therein to adjust the temperature in the photochromic-coating portion (7).

In the apparatus for coating lenses, the primer-coating portion (5) is partitioned, and temperature-adjusting means and humidity-adjusting means are provided therein to adjust the temperature and humidity in the primer-coating portion (5).

In the apparatus for coating lenses, the UV irradiation portion (8) is partitioned, and a exhaust duct (93c) is provided therein to exhaust the air in the UV irradiation portion (8) to the exterior of the apparatus body.

In the apparatus for coating lenses, the primer-coating portion (5) and the photochromic-coating portion (7) are provided with intake ducts (20a, 20b) which are arranged via filters (19a, 19b).

EFFECT OF THE INVENTION

In the apparatus for coating lenses of the invention, the carrier means is provided with an adsorbing portion for supporting the central bottom surface portion of the lens by the air suction means, and the support shaft is surrounded by a lens-placing portion for supporting the bottom surface of the lens other than the regions of the lens that are supported by the support shaft and by the adsorbing portion, and the lens is temporary-placed on the lens-placing portion at the time of receiving or handing over the lens between the support shaft and the adsorbing portion, and at least any one of the lens-placing portion, support shaft or adsorbing portion is moved up and down so that the lens is supported by the support shaft or by the adsorbing portion. The adsorbing portion of the carrier unit for supporting the lens is of the form of a shaft and supports the central portion without imparting moment to the lens. Therefore, the lens can be conveyed without being distorted. Further, the pad can be omitted and the coating efficiency can be improved.

In the apparatus for coating lenses, the lens-placing portion comprises three or more pin members upstanded surrounding the support shaft, and the bottom surface of the lens is supported by the ends of the pin members offering an advantage in that the adsorbing portion of the carrier device can be passed through a gap between the pin members. Further, the structure is simplified.

In the apparatus for coating lenses, the carrier means is provided with two adsorbing portions, the one adsorbing portion receiving the lens supported by the support shaft via the lens-placing portion and the other adsorbing portion handing the lens supported by the adsorbing portion over to the support shaft. If the number of the adsorbing portion is only one, the adsorbing portion receives the lens, conveys the lens to the downstream side, receives the lens on the upstream side and hands the lens over to the support shaft. According to this invention, however, the lens can be received and handed over at one place, and the working efficiency can be improved.

In the apparatus for coating lenses, the apparatus body is provided with a sensor for detecting the height of the central portion of the lens and with a sensor for detecting the height of the end of a nozzle of a container that feeds the photochromic coating solution, and the distance between the end of the nozzle and the central portion of the lens is adjustable to a predetermined gap. So far, the end position of the nozzle was adjusted by hand and, therefore, the height thereof varied depending upon the skill of the operator. At the time of replacing the container, the invention now makes it possible to maintain constant the gap between the end of the nozzle and the lens irrespective of the skill of the operator. Therefore, the coating of good quality can be obtained without containing bubbles.

In the UV irradiation portion, further, the lens-placing portion used at the time of receiving or handing over the lens between the support shaft and the adsorbing portion of the carrier means, is allowed to move from under the lens supported by the support shaft. That is, the lens-placing portion is not present in the lens-holding chamber in the UV irradiation portion to realize the lens-holding chamber in a compact size yet achieving the above effect.

In the apparatus for coating lenses, the starting lens-feeding portion (2) is arranged at a position upstream of the coating line in the apparatus body. Therefore, a plurality of lenses can be set at one time in the apparatus body eliminating the need for setting the lenses piece by piece to the lens-feeding portion. The first lens sub-carrier means (31) is provided with the moving mechanism capable of moving the lens-adsorbing portion up and down, right and left, and back and forth, enabling the lenses to be smoothly handed over. Further, the starting lens-holding unit (22) can be removed from the apparatus body. In this case, the lenses can be set outside the apparatus body to further improve the working efficiency.

In the apparatus for coating lenses, further, the product lens storage portion (9) is arranged at a position downstream of the coating line in the apparatus body. Therefore, a plurality of product lenses after coated can be taken out at one time from the apparatus body improving the working efficiency. Further, when the lens-holding unit is taken out from the apparatus body, the plurality of coated lenses can be taken out at one time from the apparatus body to further improve the working efficiency. The second lens sub-carrier means (73) is provided with the moving mechanism capable of moving the lens-adsorbing portion up and down, right and left, and back and forth, enabling the lenses to be smoothly handed over.

In the apparatus for coating lenses, the lens-holding unit has, formed therein, a plurality of stepped lens-placing portions in concentric having diameters increasing upward, an open portion is formed in the central portions of the plurality of lens-placing portions and in a portion of the lens-placing portion on the side of the lens sub-carrier means enabling the lens-support portion to pass through, and the lens is placed on any one of the steps of the plurality of lens-placing portions. Therefore, the center position of the lens can be roughly determined. Besides, even a lens having a different lens diameter can be held. Formation of the open portion enables the lens-adsorbing portion of the lens sub-carrier means to easily support the lens.

Further, the apparatus for coating lenses is provided with a lens-measuring device which receives the lens from the first lens sub-carrier means (31) and detects the outer diameter of the lens, curvature thereof and height thereof. Unlike the prior art, therefore, the operator of the coating apparatus does not have to notify the lens diameter to the control unit of the coating apparatus, and is greatly relieved from the laborious work. Further, a miss in the operation can be eliminated.

In the apparatus for coating lenses, the photochromic-coating portion (7) and the primer-coating portion (5) are partitioned, and the temperatures are adjusted. Therefore, the photochromic lenses of high quality can be produced without affected by the heat generated by the UV irradiation portion (8). Further, the humidity is adjusted in the primer-coating portion (5) and the photochromic lenses of high quality can be produced. Moreover, the UV irradiation portion (8) is partitioned, and an exhaust duct (93c) is provided to exhaust the air to the exterior of the apparatus body, more reliably preventing the effect of heat upon the photochromic-coating work and upon the primer-coating work.

The primer-coating portion (5) and the photochromic-coating portion (7) are provided with intake ducts (20a, 20b) which are arranged via filters (19a, 19b), to prevent contaminated air from entering therein. With the air being taken in through the intake ducts (20a, 20b), further, the air is prevented from entering into the apparatus body through other portions.

Upon arranging the particular primer cup on the primer-coating portion (5), further, the scattered primer-coating solution can be efficiently exhausted making it possible to produce photochromic lenses of high quality.

The photochromic lenses of further improved quality can be produced if the temperature is adjusted to lie in a range of 20 to 23° C. in the photochromic-coating portion (7) and if the temperature is adjusted to lie in a range of 20 to 22° C. and the humidity is adjusted to lie in a range of 45 to 55% in the primer-coating portion (5).

The primer-coating portion (5) in the apparatus for coating lenses is provided with the support shaft, the lens-placing portion and the intake duct (134) having an intake port for taking in the primer-coating solution in the form of liquid or mist. Therefore, mist is prevented from adhering on the lenses.

Further, since the lens-placing portion is provided with the adhesion-preventing member for preventing the adhesion of the primer-coating solution in the form of liquid or mist, the primer-coating solution or the mist thereof is prevented from adhering on the lens-placing portion.

BRIEF DESCRIPTION OF THE DRAWINGS

[FIG. 7] is a plan view of a slide unit arranged in the first (or second) lens sub-carrier means of FIG. 5.

[FIG. 11] illustrates a laser beam-projecting portion and a light-receiving portion in the lens-measuring device shown in FIG. 10, wherein A is a perspective view illustrating a state where a centering rod supporting no lens is in the measuring area, B is a perspective view illustrating a state where the centering rod supporting a lens is in the measuring area, and C is a perspective view illustrating a state where an end of the lens is in the measuring area.

[FIG. 12] illustrates the laser beam-projecting portion and the light-receiving portion in the lens-measuring device shown in FIG. 10, wherein A is a plan view illustrating a state where a leading end of the lens in the direction in which it is moving is traveling through the measuring area, B is a plan view illustrating a state where the trailing end of the lens in the direction in which it is moving is traveling through the measuring area, and C is a plan view illustrating a state where the trailing end side of the lens in the direction in which it is moving is traveling through the measuring area.

DESCRIPTION OF REFERENCE NUMERALS

1—coating apparatus
5—primer-coating portion
7—photochromic-coating portion
10—lenses
22—starting lens-holding unit
25 to 30, 75a—lens-placing portions
31—first lens sub-carrier means
43—slide unit
45—lens-support unit
48—lens-measuring unit
57a—centering rod
58d—pins
60—laser beam-projecting portion
61—laser beam-receiving portion
65—primer-coating device
66—photochromic-coating device
73—second lens sub-carrier means
75—product lens-holding unit
131—upper cup
131a, 132a—center openings
132—middle cup
133—lower cup
133a—cylindrical member
134—intake duct

BEST MODE FOR CARRYING OUT THE INVENTION

An embodiment of the invention will now be described with reference to the drawings as an example of using a preferred coating apparatus. In this specification, the X-axis direction of the coating apparatus of FIG. 1 is regarded to be the direction of width of the coating apparatus, the Y-axis direction is regarded to be the back-and-forth direction (direction opposite to the arrow of Y-axis is regarded to be the front side), and the Z-axis direction (direction perpendicular to the surface of paper in FIG. 1) is regarded to be the up-and-down direction.

Figure 1:
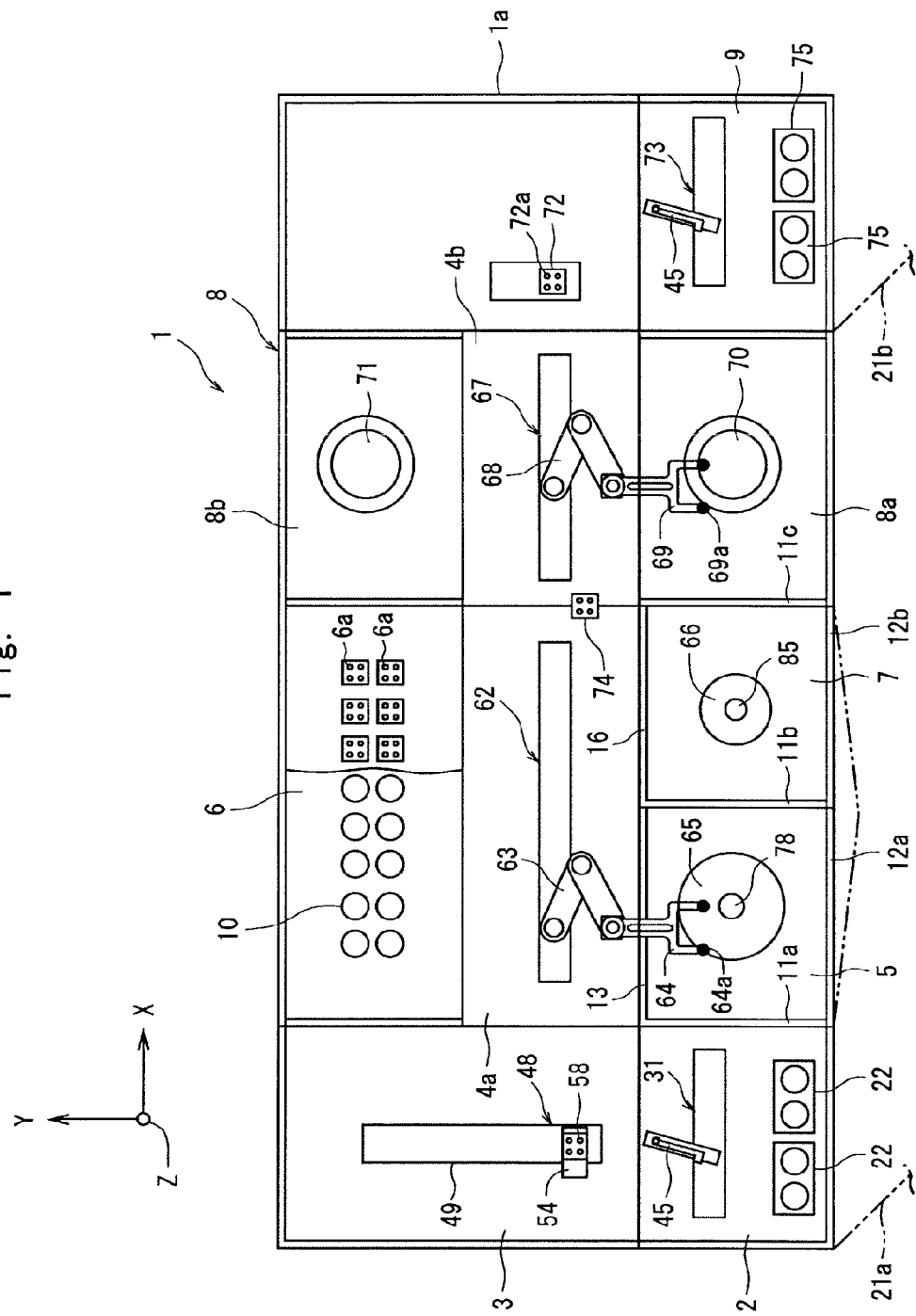
[FIG. 1] is a plan view schematically illustrating the whole coating apparatus according to an embodiment of the invention.

A body 1a of the coating apparatus 1 shown in FIG. 1 is forming a coating line which comprises a lens-measuring portion 3 for measuring the shape of the starting lens, a primer-coating portion 5 for applying a primer solution onto the starting lens to prepare a first intermediate product lens having an undried primer coating, a drying portion 6 for drying the undried primer coating of the first intermediate product lens to prepare a second intermediate product lens having a dry primer coating, a photochromic-coating portion 7 for applying a photochromic coating solution onto the second intermediate product lens to prepare a third intermediate product lens having an uncured photochromic coating, and two UV irradiation portions 8a and 8b for irradiating the third intermediate product lens with UV to cure the uncured photochromic coating, along the flow of operation for coating the lenses. The coating line is, further, provided with a third intermediate product lens temporary-placing portion 74 for temporary-placing the third intermediate product lens, and with a product lens temporary-placing portion 72 for temporary-placing the product lens. Here, the starting lens, first intermediate product lens, second intermediate product lens, third intermediate product lens and product lens stand for the lenses in the above-mentioned modes. In the following description, however, these lenses are often simply called lenses.

The UV curing requires an extended period of time as compared to the photochromic coating. When only one UV irradiation portion is provided, therefore, the operation of the photochromic-coating portion 7 must be once discontinued to adjust the time after the end of treatment by the photochromic-coating portion 7 until the end of treatment by the UV irradiation portion. The apparatus shown in FIG. 1, however, is provided with the third intermediate product lens temporary-placing portion 74 and with two UV irradiation portions 8a and 8b. Therefore, the third intermediate product lens prepared while the one UV irradiation portion (e.g., 8a) is in operation is once placed on the third intermediate product lens temporary-placing portion 74 and is, thereafter, carried to the other UV irradiation portion (e.g., 8b) that is not operating. Therefore, the photochromic-coating portion 7 is allowed to operate continuously.

In the coating apparatus, the starting lens and intermediate product lenses are carried by the main carrier means arranged in the coating line. The main carrier means in the coating apparatus 1 shown in FIG. 1 includes two main carrier means, i.e., (i) a first main carrier means 62 having a function for carrying the starting lens from the lens-measuring portion 3 to the primer-coating portion 5, a function for carrying the first intermediate product lens from the primer-coating portion 5 to the drying portion 6, a function for carrying the second intermediate product lens from the drying portion 6 to the photochromic-coating portion 7, and a function for carrying the third intermediate product lens from the photochromic-coating portion to the third intermediate product lens temporary-placing portion 74, and (ii) a second main carrier means having a function for carrying the third intermediate product lens from the third intermediate product lens temporary-placing portion 74 to the UV irradiation portion 8, and a function for carrying the product lens from the UV irradiation portion 8 to the product lens temporary-placing portion 72. The first main carrier means 62 is arranged in a first main carrier portion 4a adjacent to the lens-measuring portion 3, primer-coating portion 5, drying portion 6, photochromic-coating portion 7 and third intermediate product lens temporary-placing portion 74, while the second main carrier means 67 is arranged in a second main carrier portion 4b adjacent to the third intermediate product lens temporary-placing portion 74, product lens temporary-placing portion 72 and UV irradiation portions 8a and 8b.

The coating apparatus 1 has the starting lens-feeding portion 2 arranged at a position upstream of the coating line in the apparatus body. The lens-feeding portion 2 is a place where the starting lenses are placed waiting for being primer- and photochromic-coated, and serves as a stock yard for storing the starting lenses prepared outside the apparatus. The starting lenses are brought into the starting lens-feeding portion 2 from the exterior of the apparatus. Therefore, the starting lens-feeding portion 2 is, usually, arranged in front of the apparatus or by the side thereof for easy operation by the operator.

It is desired to increase the degree of cleanness in the apparatus for coating lenses in order to prevent foreign matters such as dust from adhering on the surfaces of the starting lenses or on the surfaces of the intermediate product lenses in the steps of the coating line. For this purpose, the front side wall of the starting lens-feeding portion 2 in the coating apparatus 1 is provided with an opening/closing door 21a for carrying the starting lenses therein from the exterior.

The starting lens-feeding portion 2 is provided with a starting lens-holding unit 22 and a first lens sub-carrier means 31 for carrying the starting lenses from the starting lens-holding unit 22 to the lens-measuring portion 3.

The starting lens-feeding portion 2 of the coating apparatus 1 shown in FIG. 1 has two starting lens-holding units 22 arranged therein. The starting lens-holding units 22 may be provided being fixed in the coating apparatus 1 or may be of the type of cartridges so as to be removably provided in the coating apparatus 1. When removably provided, it is desired that the starting lens-holding units 22 are provided at predetermined positions in the starting lens-feeding portion 2 by providing attachment guides or the like. This establishes a predetermined positional relationship relative to the first lens sub-carrier means 31 which is fixed in the starting lens-feeding portion 2, and the first lens sub-carrier means 31 can be easily controlled for its operation.

When the starting lens-holding units 22 are provided in a fixed manner, the opening/closing door 21a is opened to place the lenses on the lens-holding units 22. When the starting lens-holding units 22 are removably provided, the lenses can be placed on the starting lens-holding units 22 on the outside of the coating apparatus 1.

Figure 2:
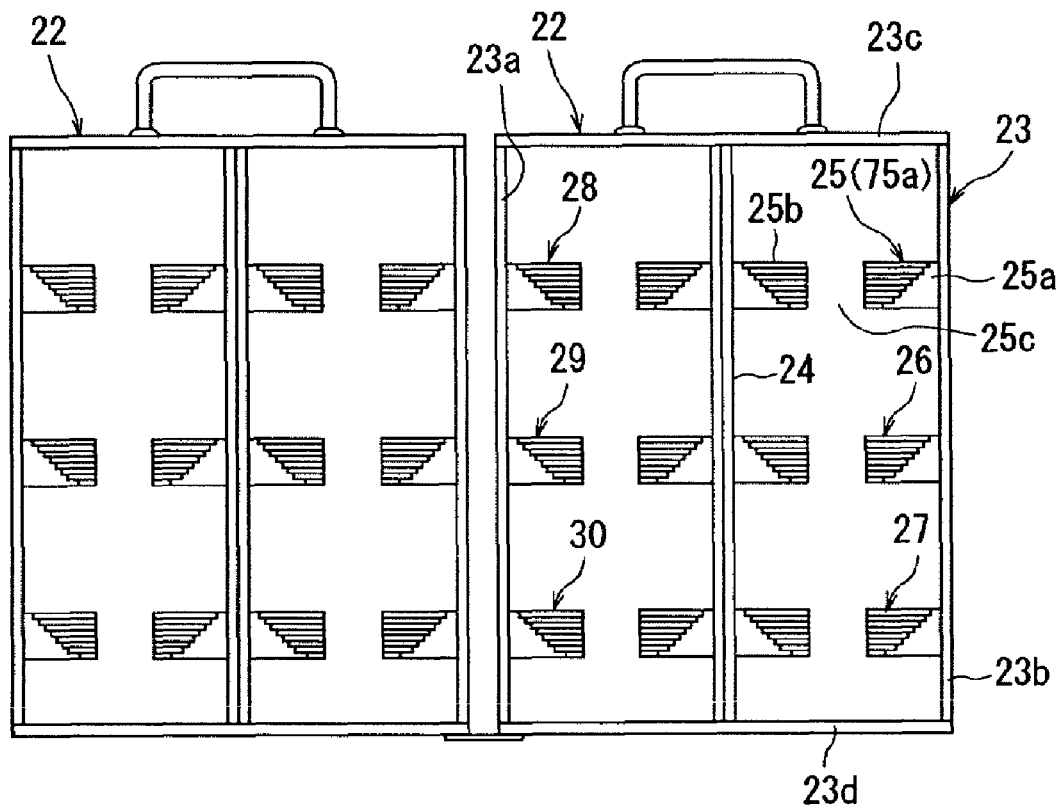
[FIG. 2] is a front view of a starting lens-holding unit arranged in the coating apparatus of FIG. 1.
Figure 3:
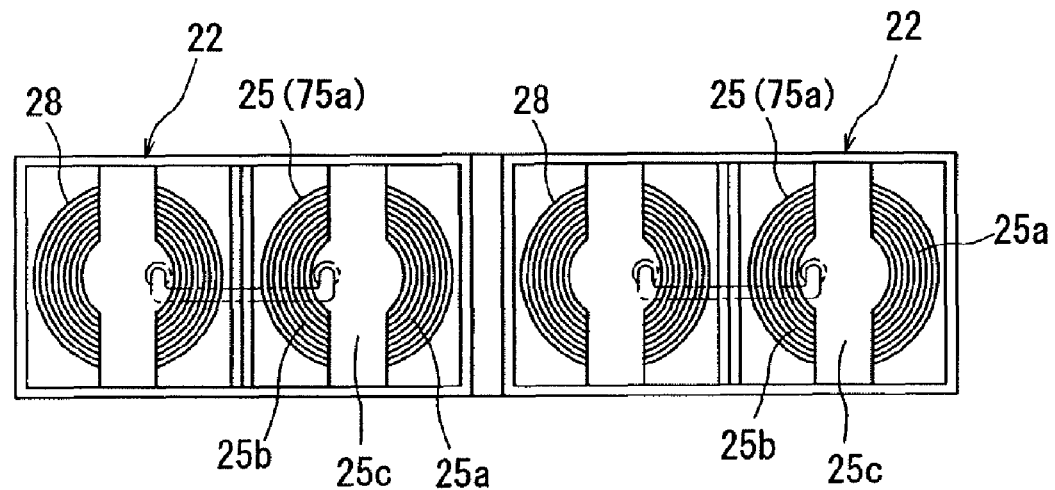
[FIG. 3] is a plan view of the starting lens-holding unit arranged in the coating apparatus of FIG. 1.

FIGS. 2 and 3 are views illustrating, on an enlarged scale, the starting lens-holding units 22, FIG. 2 being a front view of the starting lens-holding units 22 as viewed from the inside of the apparatus body 1a and FIG. 3 being a plan view thereof.

The pair of starting lens-holding units 22 has the same shape and, therefore, the one starting lens-holding unit 22 will now be described. The starting lens-holding unit 22 has an outer frame 23 of a square shape which is constituted by right and left longitudinal frames 23a, 23b, and upper and lower transverse frames 23c, 23d. At the center of the starting lens-holding unit 22 in the right-and-left direction, an inner frame 24 is arranged in the up-and-down direction. The inner frame 24 is constituted by two pieces of plate members but may be constituted by one piece of plate member. In this embodiment, the two pieces of inner frames are generally referred to as the inner frame 24.

The starting lens-holding unit 22 has lens-placing portions 25 to 30 arranged among the inner frame 24, right longitudinal frame 23b and left longitudinal frame 23a, the lens-placing portions 25 to 27 being arranged on one side of the starting lens-holding unit 22 and the lens-placing portions 28 to 30 being arranged on the other side thereof maintaining a gap in the up-and-down direction.

The lens-placing portions 25 to 30 are of the same shape, and only the one lens-placing portion 25 will now be described. The lens-placing portion 25 is constituted by two right and left split block plates 25a and 25b, the one block plate 25a being fixed to the right longitudinal frame 23b and the other block plate 25b being fixed to the inner frame 24. In a state where the starting lens-holding unit is set to the coating apparatus 1, therefore, an open portion (gap portion) 25c is formed penetrating through the lens-placing portion 25 in the Y-axis direction.

Figure 4:
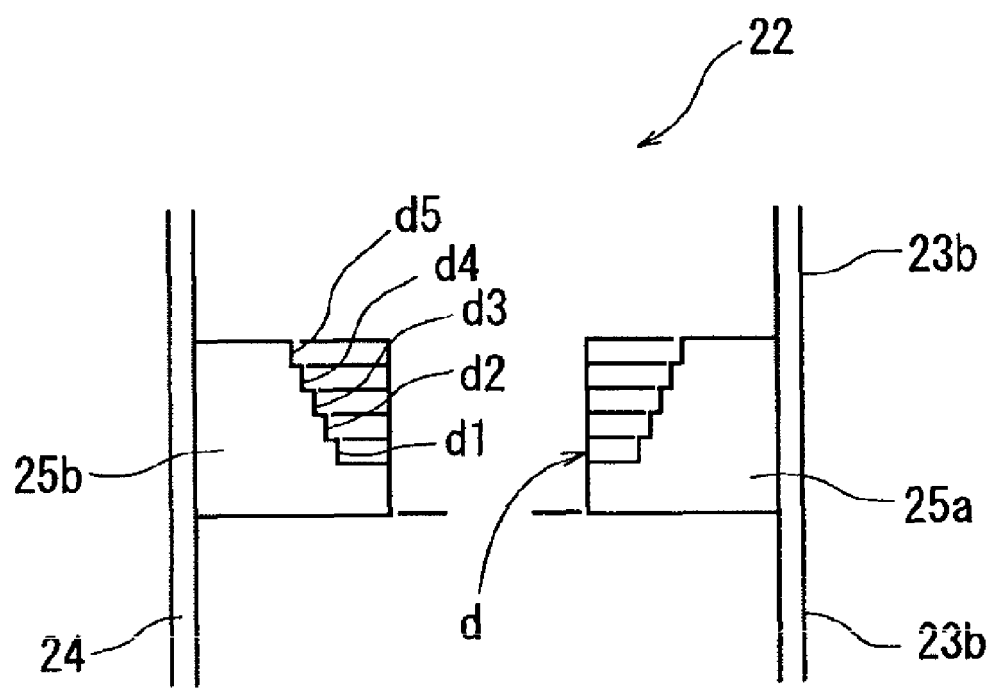
[FIG. 4] is a front view illustrating, on an enlarged scale, a lens-placing portion arranged in the starting lens-holding unit of FIG. 2.

Referring to FIG. 4, the block plates 25a and 25b are forming steps d arranged in concentric for centering the lens 10. Curved surfaces of the steps d are so formed as to be corresponded to the outer circumferential shapes of the lenses 10. A circle is formed if the curved surfaces are extended in each of the steps d1 to d5. Namely, lenses having a small diameter up to a large diameter can be centered in order of the steps d1, d2, d3, d4 and d5 from the lower side.

Referring to FIG. 2, the lens-placing portions 25 to 27 are arranged up and down with their center axes in concentric. The lens-placing portions 25 and 28 of the upper stage arranged in the transverse direction are horizontal to each other, the lens-placing portions 26 and 29 of the middle stage arranged in the transverse direction are horizontal to each other, and the lens-placing portions 27 and 30 of the lower stage arranged in the transverse direction are horizontal to each other. Upon arranging a plurality of lenses on the starting lens-holding unit 22 on a straight line in the horizontal direction and/or in the up-and-down direction, it is allowed to simplify the mechanism for driving the first lens sub-carrier means 31 at the time of taking the starting lenses out of the starting lens-holding unit 22.

Figure 5:
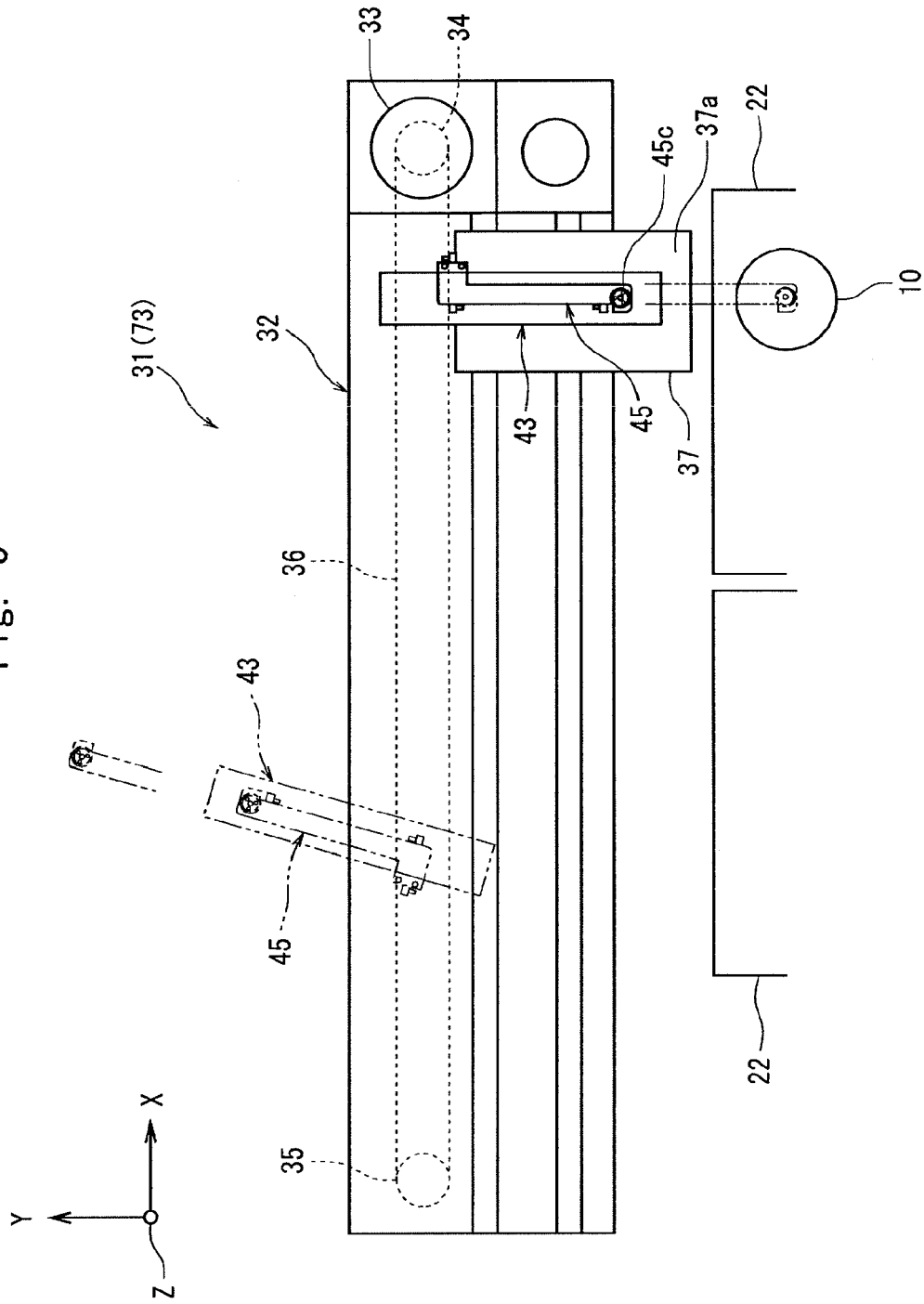
[FIG. 5] is a plan view of a first (or second) lens sub-carrier means arranged in the coating apparatus of FIG. 1.
Figure 6:
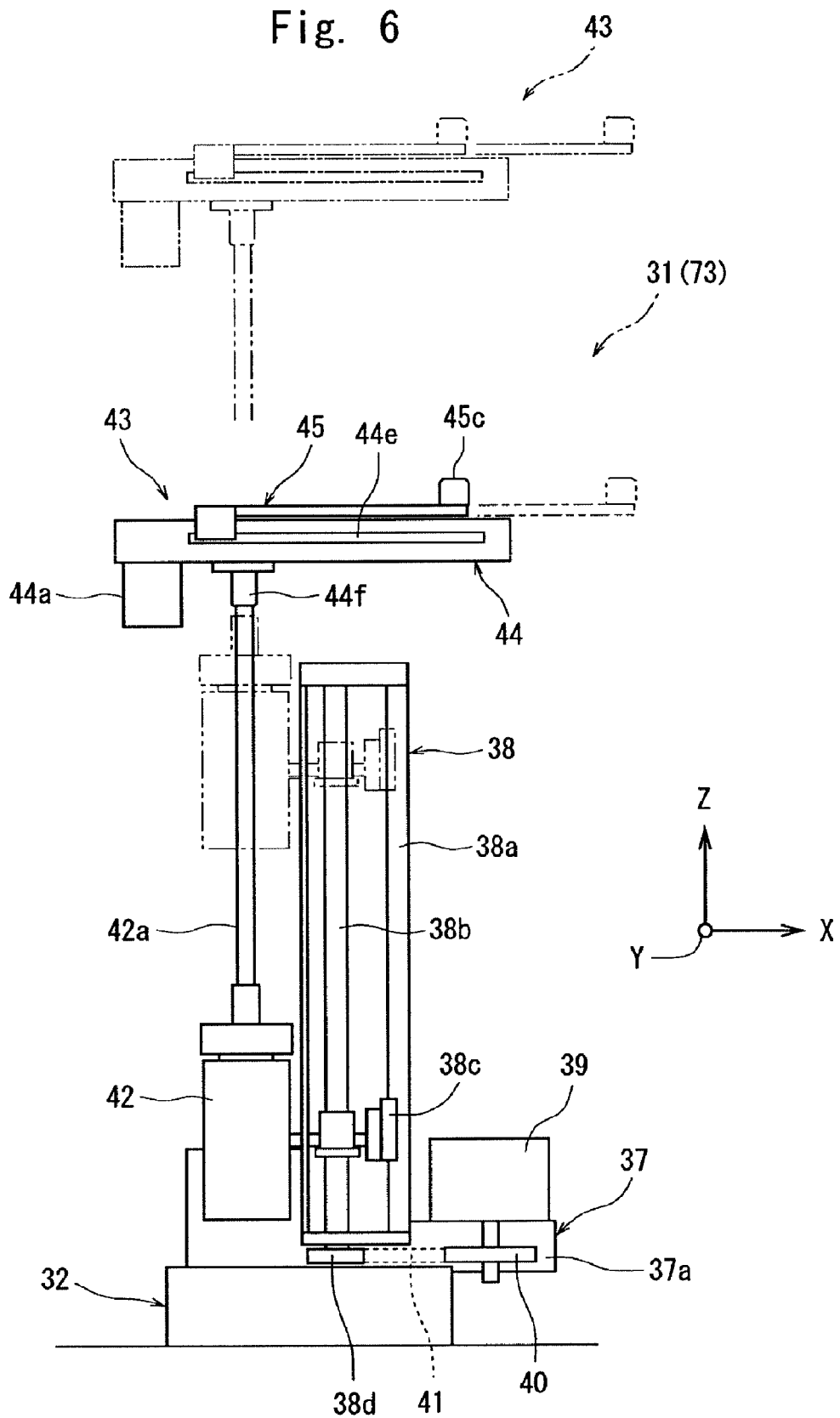
[FIG. 6] is a side view of the first (or second) lens sub-carrier means.

FIGS. 5 and 6 illustrate the first lens sub-carrier means 31. The first lens sub-carrier means 31 has substantially the same structure as the second lens sub-carrier means 73 but carries lenses of a different kind (starting lenses or product lenses).

The first lens sub-carrier means 31 has an X-axis guide unit 32 which serves as a base plate extending in the X-axis direction. The X-axis guide unit 32 has a pulse motor 33 arranged on one end side thereof, and a drive pulley 34 is connected to the lower end of the pulse motor 33. A driven pulley 35 that is rotatably supported is provided on the other end side of the X-axis guide unit 32, and a belt 36 is wound round the drive pulley 34 and the driven pulley 35. A slide unit 37 is coupled to the belt 36 and moves along the X-axis direction as the belt 36 is turned and moved by the pulse motor 33.

A Z-axis unit 38 is provided on the upper surface of a base plate 37a provided on the slide unit 37. The Z-axis unit 38 is provided with a guide rail 38a and a Z-axis ball screw 38b extending in the up-and-down direction in parallel. A lift member 38c is fitted to the guide rail 38a so as to slide up and down, and is screwed onto the Z-axis ball screw 38b.

A pulse motor 39 is arranged on the base plate 37a, and a drive pulley 40 is connected to the lower end of the pulse motor 39. The drive pulley 40 is coupled via a belt 41 to a driven pulley 38d rotatably attached to the lower end of the Z-axis ball screw 38b. The Z-axis ball screw 38b rotates accompanying the rotation of the drive pulley 40. The lift member 38c moves up and down accompanying the rotation of the Z-axis ball screw 38b.

A pulse motor 42 is attached to the lift member 38c, and a slide unit 43 is attached, via a coupling portion 44f, to the upper part of the rotary shaft 42a of the pulse motor 42. As represented by a two-dot chain line in FIG. 6, the pulse motor 42 is capable of moving up and down together with the lift member 38c.

Figure 8:
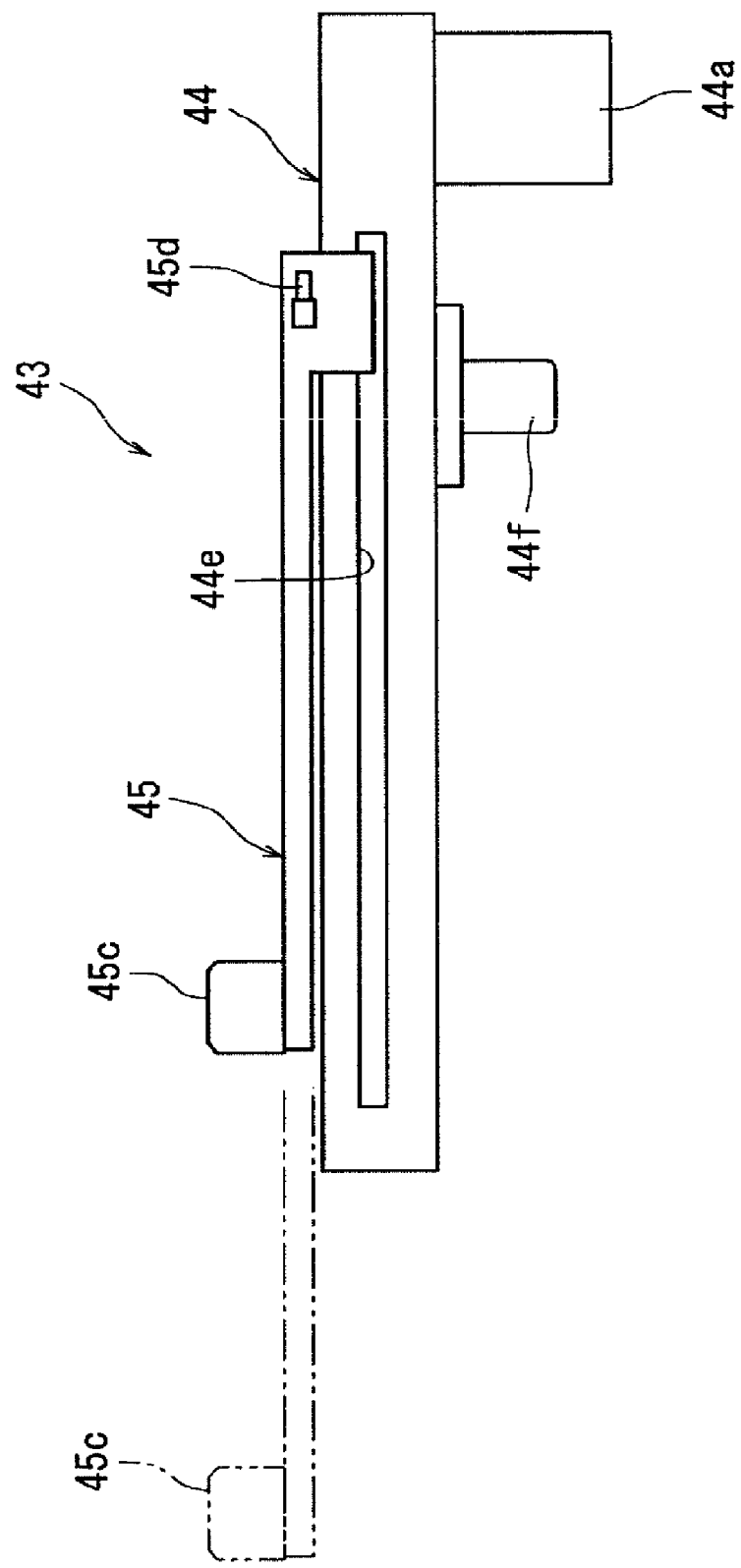
[FIG. 8] is a side view of the slide unit arranged in the first (or second) lens sub-carrier means of FIG. 5.

Referring to FIGS. 7 and 8, the slide unit 43 includes a rotary plate 44 and a lens-support unit 45 for sub-carrier means provided on the rotary plate 44. Upon driving the pulse motor 42 (see FIG. 6), the rotary plate 44 rotates about the rotary shaft 42a(44f). A pulse motor 44a is arranged at an end in the rotary plate 44, and a drive pulley 44b is connected to the lower end of the pulse motor 44a. A driven pulley 44c is arranged at the other end in the rotary shaft 44, and the drive pulley 44b and the driven pulley 44c are coupled together via a belt 44d. The belt 44d is connected to an attaching portion 45a of the lens-support unit 45 for sub-carrier means.

The lens-support unit 45 for sub-carrier means is provided with a slide member 45b on the proximal end side thereof, the slide member 45b being slidably fitted to a guide slit 44e formed in the side surface of the rotary plate 44. As the pulse motor 44a rotates, the lens-support unit 45 for sub-carrier means moves back and forth together with the belt 44d along the upper surface of the rotary plate 44 (see two-dot chain line in FIGS. 7 and 8). Being constituted as described above, the first lens sub-carrier means 31 is capable of moving a lens-adsorbing portion 45c that will be described below back and forth, right and left, and up and down, and is, further, capable of turning it.

Referring to FIGS. 7 and 8, the lens-adsorbing portion 45c is attached to an end of the lens-support unit 45 for sub-carrier means to support the bottom surface of the lens by the suction of the air. A joint 45d is connected to the side surface of the lens-support unit 45 for sub-carrier means on the proximal end side thereof. The joint 45d is connected to air suction means that is not shown, and is communicated (not shown) with the lens-adsorbing portion 45c inside the lens-support unit 45 for sub-carrier means. In a state where the lens 10 is placed, the lens-adsorbing portion 45c supports the bottom surface of the lens 10 by the suction of the air. The lens stands for a starting lens in the first lens sub-carrier means 31, and stands for a product lens in the second lens sub-carrier means 73.

Figure 9:
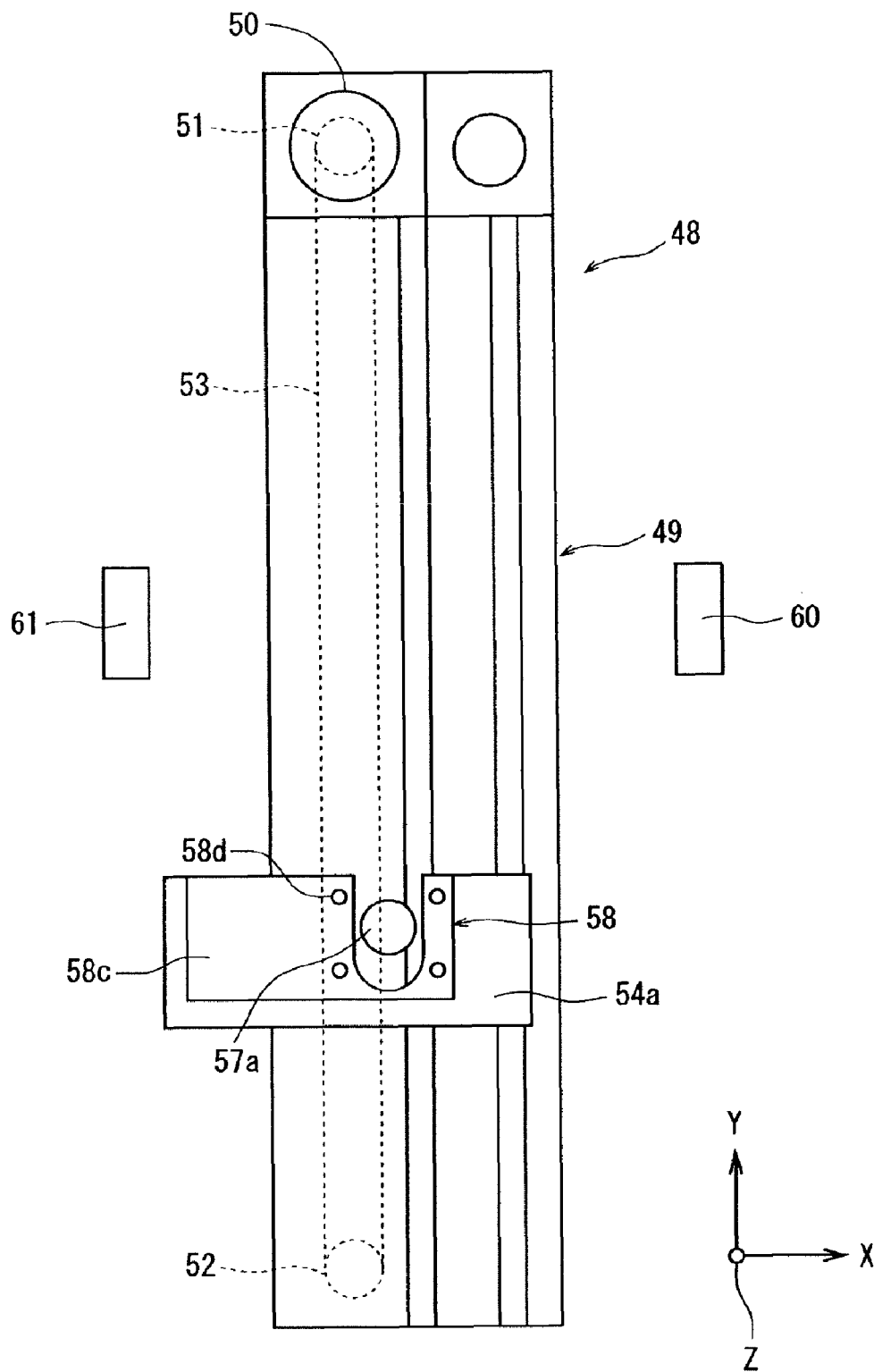
[FIG. 9] is a plan view of a lens-measuring device in the coating apparatus shown in FIG. 1.
Figure 10:
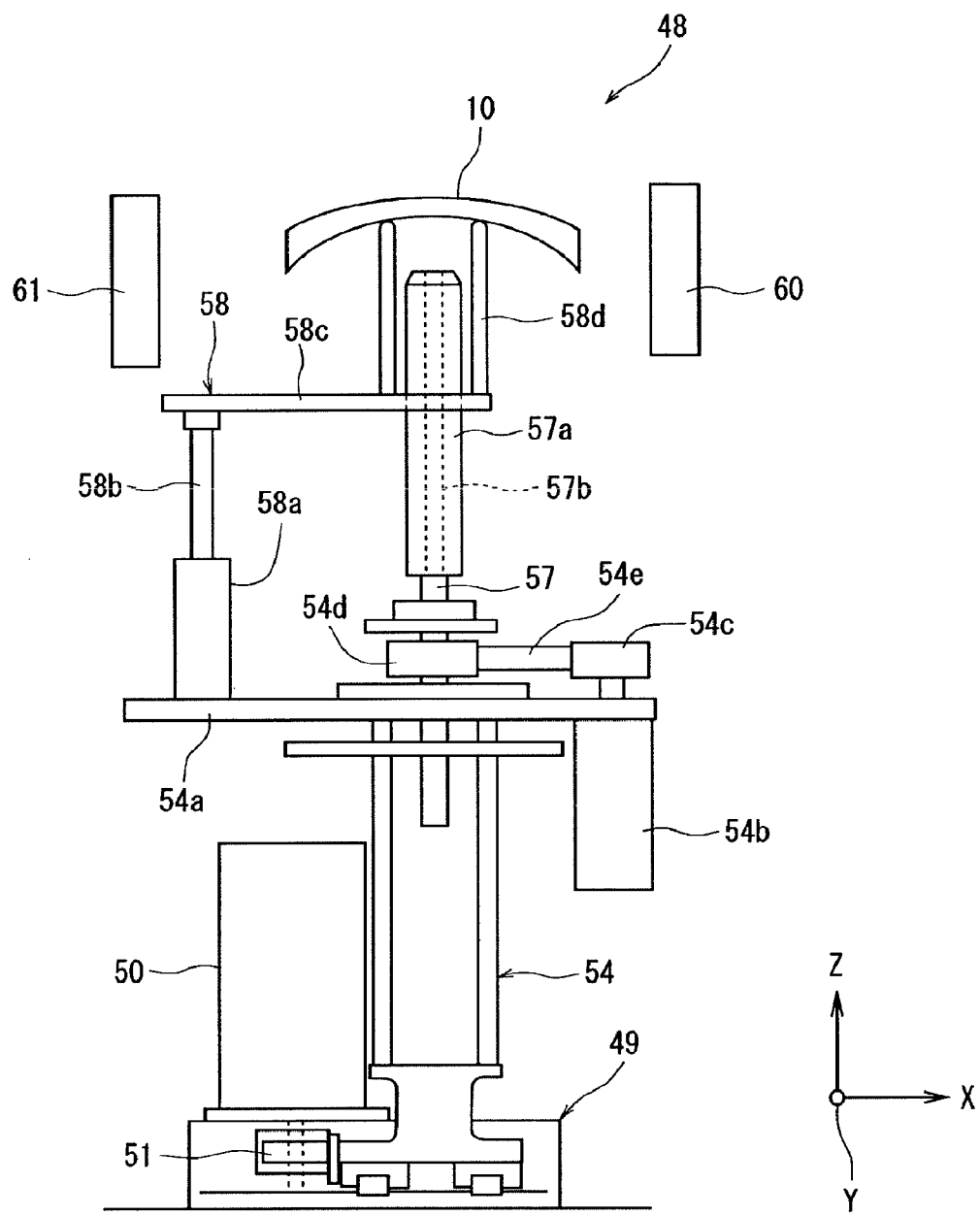
[FIG. 10] is a side view of the lens-measuring device in the coating apparatus shown in FIG. 1.

FIGS. 9 and 10 illustrate a lens-measuring device 48 arranged in the lens-measuring portion 3. The lens-measuring device 48 receives the lens from the first lens sub-carrier means 31, and detects the outer diameter, curvature and height of the lens.

In the lens-measuring device 48, a Y-axis guide unit 49 which serves as a base plate is extending in the Y-axis direction. The Y-axis guide unit 49 has a pulse motor 50 arranged on one end side thereof, and a drive pulley 51 is connected to the lower end of the pulse motor 50. A driven pulley 52 that is rotatably supported is provided on the other end side of the Y-axis guide unit 49, and a belt 53 is wound round the drive pulley 51 and the driven pulley 52. A slide unit 54 is attached to the belt 53, and moves in the Y-axis direction as the belt 53 turns and moves.

A pulse motor 54b is mounted on the base plate 54a provided on the slide unit 54, and a drive pulley 54c is connected to the upper part of the pulse motor 54b. The drive pulley 54c is coupled, via a belt 54e, to a driven pulley 54d rotatably attached to the lower end of the rotary shaft 57. The rotary shaft 57 is supported by the base plate 54a and is rotated accompanying the rotation of the drive pulley 54c. A centering rod 57a is provided at an upper part of the rotary shaft 57. The central portion of the centering rod 57a is coupled to a hole 57b for adsorbing the lens, that is coupled to air suction means that is not shown, and the bottom surface of the lens 10 is supported by the end portion of the centering rod 57a. The centering rod 57a corresponds to the support shaft of the invention. As the pulse motor 54b rotates, the centering rod 57a rotates due to the rotation of the rotary shaft 57.

Further, the base plate 54a is provided with a lens-support unit 58 for measurement. The lens-support unit 58 for measurement includes an air cylinder 58a attached on the base plate 54a. A lens-support plate 58c is attached to an expansible rod 58b of the air cylinder 58a, and a lens-placing portion is provided on the upper surface of the lens-support plate 58c.

There is no particular limitation on the lens-placing portion provided it supports the bottom surface of the lens other than the regions of the lens supported by the lens-adsorbing portion 45c of the lens-support unit 45 and by the centering rod 57a (support shaft). In particular, the lens-placing portion may be constituted by three or more pin members permitting the lens-adsorbing portion 45c to pass through a gap between the pin members to improve the operability. Further, the pin members can be easily manufactured contributing to decreasing the weight of the lens-placing portion and decreasing damage to the apparatus, offering quite a lot of advantages. In the following description, the lens-placing portions of the invention are all constituted by upstanding the pins.

Four pins 58*d* are upstanded along a concentric circle on the upper surface of the lens-support plate 58*c* to constitute the lens-placing portion. The lens-support plate 58*c* can be ascended or descended by driving the air cylinder 58*a*. The upstand pins 58*d* are arranged in a square shape, and at the central portion thereof is arranged the center of the centering rod 57*a* (support shaft). The lens 10 can be placed on the ends of the upstand pins 58*d*, and can be handed over to, or received from, the end of the centering rod 57*a* (support shaft) by moving the lens-support unit 58 for measurement up and down.

On both sides of the lens-measuring device 48 as shown in FIGS. 10 to 12, a laser beam-projecting portion 60 is provided on one side and a laser beam-receiving portion 61 is provided on the other side being corresponded to the laser beam-projecting portion 60. If a laser beam is projected from the laser beam-projecting portion 60 toward the laser beam-receiving portion 61, the laser beam is received by the laser beam-receiving portion 61. Referring to FIG. 11, the lens 10 is fixed to the end of the centering rod 57*a* (support shaft) which is then rotated and moved straight to move the lens 10 into the measuring area a to detect the outer diameter, curvature and height of the lens.

Next, described below are the procedure and device for carrying the lens to the primer-coating portion 5 after the lens-measuring device 48 has detected the outer diameter, curvature and height of the lens.

Figure 13:
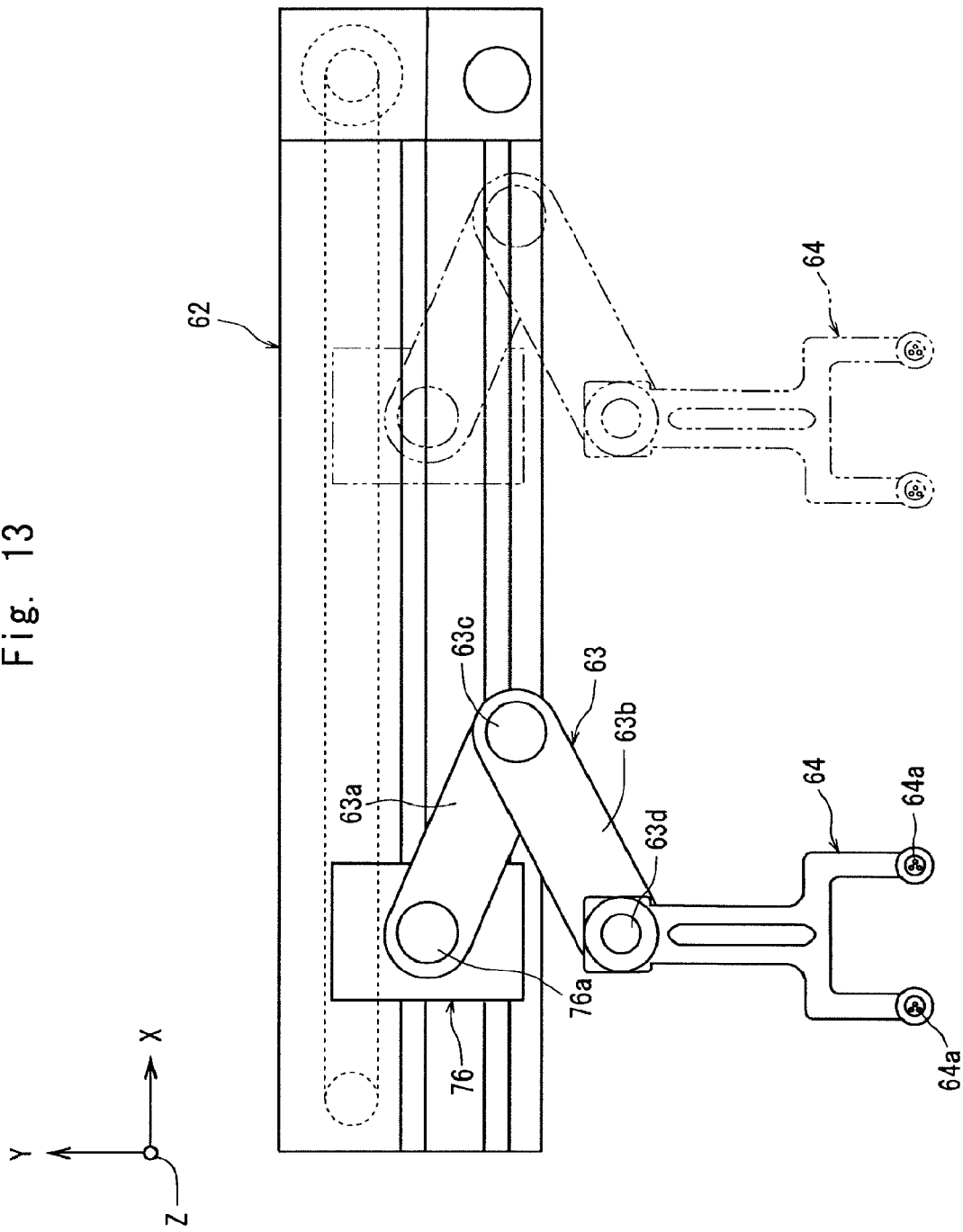
[FIG. 13] is a plan view of a first main carrier means.
Figure 20:
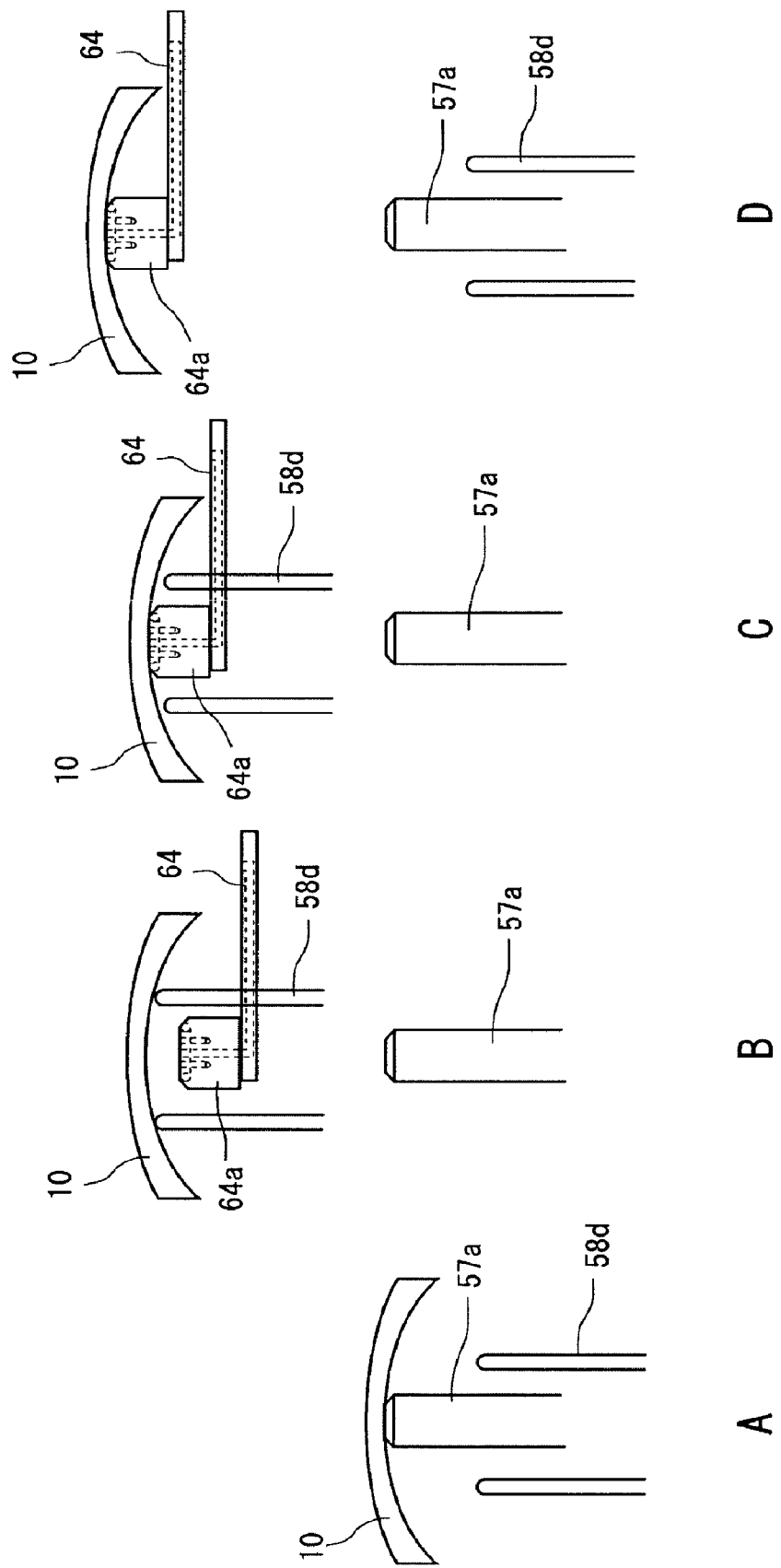
[FIG. 20]A is a side view illustrating a state where the centering rod of the lens-measuring unit is supporting the lens, B is a side view illustrating a state where the upstand pins are ascended to support the lens, C is a side view illustrating a state where the adsorbing portion of a hand-over hand is receiving the lens from the upstand pins, and D is a side view illustrating a state where the adsorbing portion of the hand-over hand is supporting the lens.

Referring to FIG. 1, a first main carrier means 62 is arranged in the first main carrier portion 4*a*. Referring to FIG. 13, a slide unit 76 is arranged on the first main carrier means 62 to slide in the X-axis direction, and an arm 63 is arranged on the slide unit 76 so as to rotate about a shaft 76*a*. The arm 63 is constituted by a first arm 63*a* on the proximal end side and a second arm 63*b* on the distal end side. The second arm 63*b* is arranged to rotate about a rotary shaft 63*c* at a portion articulated to the first arm 63*a*. A hand-over hand 64 is connected to an end of the second arm 63*b*, and can rotate about a rotary shaft 63*d* at the articulate portion. At an end of the hand-over hand 64, an adsorbing portion 69*a* (see FIG. 20) is formed being communicated with air suction means that is not shown. The adsorbing portion 64*a* is allowed to move over a rotational range of 360 degrees due to the rotational motions of the first arm 63*a*, second arm 63*b* and hand-over hand 64. The hand-over hand 64 can receive the lens 10 from the lens-support unit 58 for measurement of the lens-measuring device 48, and can carry the lens 10 to the primer-coating portion 5, drying portion 6 and photochromic-coating portion 7, successively.

The slide unit 76 of the first main carrier means 62 can employ the X-axis slide mechanism and the Z-axis slide mechanism which are basically the same as those of the slide unit 37 of the first lens sub-carrier means 31, and is not described here again.

Figure 14:
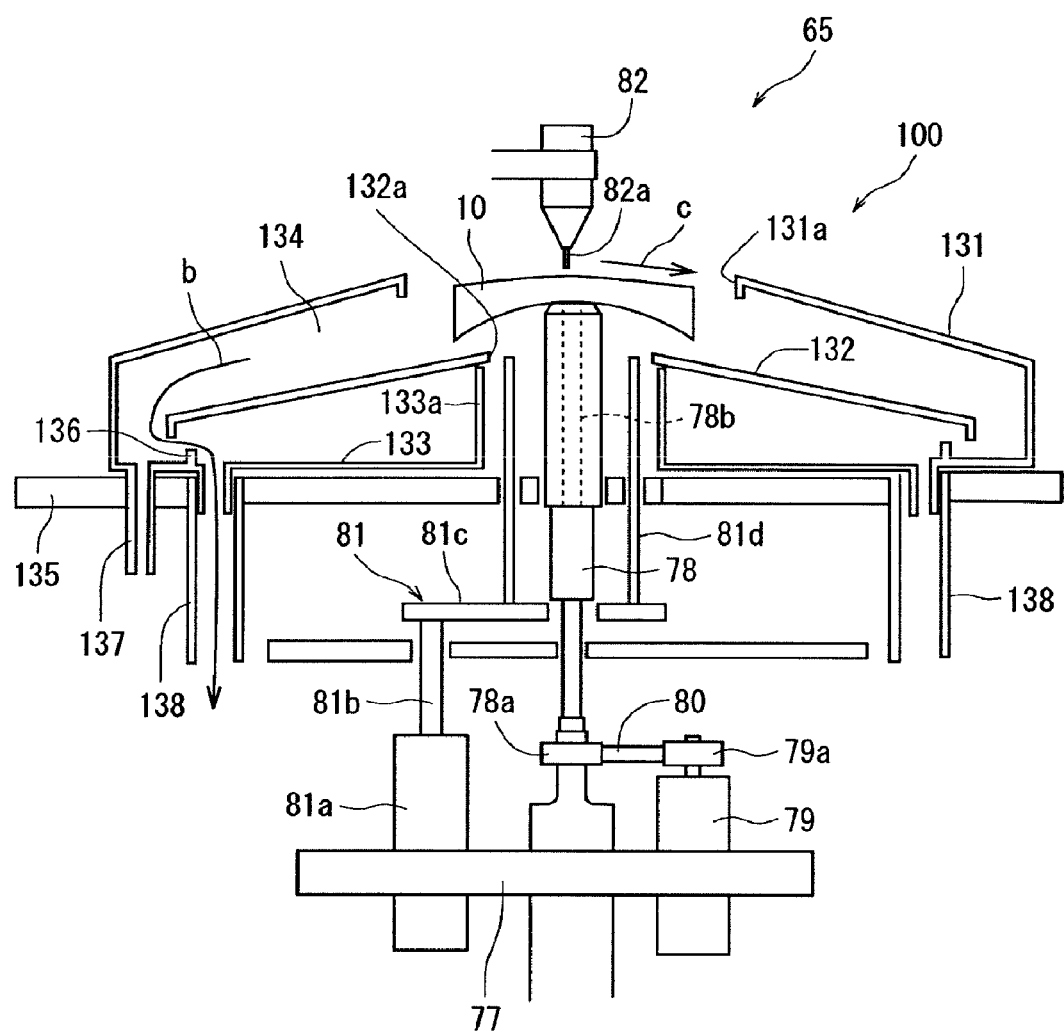
[FIG. 14] is a front view of a primer-coating device arranged in the primer-coating portion of FIG. 1.

Referring to FIG. 14, a primer-coating device 65 arranged in the primer-coating portion 5 has a spin shaft 78 (support shaft) rotatably arranged on a base plate 77 and a pulse motor 79 attached thereto. A drive pulley 79*a* is attached to an upper part of the rotary shaft of the pulse motor 79 and is coupled, via a belt 80, to a driven roller 78*a* attached to the spin shaft 78. A flow hole 78*b* is formed in the central portion of the spin shaft 78 and is communicated with the air suction means that is not shown to support the bottom portion of the lens 10 by the suction of the air. Here, the spin shaft 78 corresponds to the support shaft of the invention.

The primer-coating device 65 is provided with a lens-support unit 81 for primer coating. The lens-support unit 81 for primer coating is supported by an air cylinder 81*a* mounted on the base plate 77. A lens-support plate 81*c* is attached to an end of an expansible rod 81*b* of the air cylinder 81*a*, and four pins 81*d* are upstanded upright on the upper surface of the lens-support plate 81*c* to form a lens-placing portion. Upon driving the air cylinder 81*a*, the lens-support plate 81*c* can be moved in the up-and-down direction. The upstand pins 81*d* have the same structure as the upstand pins 58*d* shown in FIGS. 9 and 10, and are capable of temporary-supporting the lens 10 at the end portions thereof. Upon moving the lens-support unit 81 for primer coating up and down, the lens 10 can be handed over to, and received from, the spin shaft 78.

A dispense valve 82 is provided over the spin shaft 78 to apply a primer-coating solution onto the lens 10. The primer-coating solution is applied onto the lens 10 from a nozzle 82*a* formed at an end of the dispense valve 82. Though not shown, a primer-coating solution tank (not shown) is connected upstream of the dispense valve 82 via a pipe. Prior to blowing out the primer coating, the interior of the tank is maintained under a pressurized state with a gas such as nitrogen and upon opening the dispense valve 82, the primer-coating solution can be blown out from the nozzle 82*a*. After the coating has been finished, the interior of the tank is opened to the atmospheric pressure.

Referring to FIG. 14, the pins 81*d* are upstanded upright on the upper surface of the lens-support plate 81*c* surrounding the spin shaft 78, and the lens 10 is handed over to, or received from, the spin shaft 78 via the upstand pins. In this case, it is desired that the primer-coating device 65 is provided with a primer cup 100. The primer cup 100 is constituted by an upper cup 131, a middle cup 132 and a lower cup 133. The upper cup 131 is arranged on the outer side of the middle cup 132 maintaining a gap, has a center opening 131*a* at a position slightly higher than the position of the lens 10, and is shaped like a dome. The middle cup 132 has a center opening 132*a* at a position lower than the position of the lens 10, and is shaped like a dome. The intake duct 134 is formed by the upper cup 131 and the middle cup 132, and the intake port of the intake duct is formed by the opening 131*a* and the opening 132*a*. There is no particular limitation on the upper cup 131 and on the middle cup 132 if their openings 131*a*, 132*a* or the intake ports are formed at the positions mentioned above. Here, however, it is desired that the upper cup 131 and the middle cup 132 have the openings 131*a* and 132*a* at their highest positions, and the peripheries thereof are lowered outwards in the radial direction to form the intake duct 134. Particularly preferably, the intake duct 134 is tilted in compliance with the shape of the lens. This makes it possible to form an efficient intake duct.

The tray-like lower cup 133 is placed on the upper surface of the support plate 135, and the outer circumferential portion of the lower cup 133 is coupled to the lower portion of the upper cup 131. The lower cup 133 is forming an annular wall 136 on the inside of the outer circumferential portion of the middle cup 132 in the radial direction, a primer drain 137 is formed on the outer side of the annular wall 136, and a exhaust port 138 is formed on the inner side thereof. The exhaust port 138 is connected to a suction pump for sucking the air that is not shown, and the primer drain 137 is connected to a primer solution recovering tank that is not shown. In the case of the embodiment shown in FIG. 14, the exhaust port for exhausting the primer-coating solution in the form of liquid and mist to the exterior, corresponds to the primer drain 137 and to the exhaust port 138. In FIG. 14, further, the primer drain 137 and the exhaust port 138 are separately drawn as exhaust ports which, however, may be combined into one exhaust port.

On the inside of the lower cup 133, a cylindrical member 133a is provided upright as a member for preventing the adhesion of the primer-coating solution or the mist thereof at the time of coating. When the lens-support portion 81 is lowered, the cylindrical member 133a surrounds the upstand pins 81d. The cylindrical member 133a is so arranged that the upper end thereof is positioned at the circumferential edge of the center opening 132a of the middle cup 132.

The primer-coating portion 5 shown in FIG. 1 has its side walls partitioned by partitioning walls 11a and 11b made of a metal such as a stainless steel, a transparent glass or a transparent synthetic resin, the front wall being partitioned by an opening/closing door 12a that can be opened and closed, and the rear wall on the side of the first main carrier portion 4a being partitioned by a partitioning wall 13.

Figure 23:
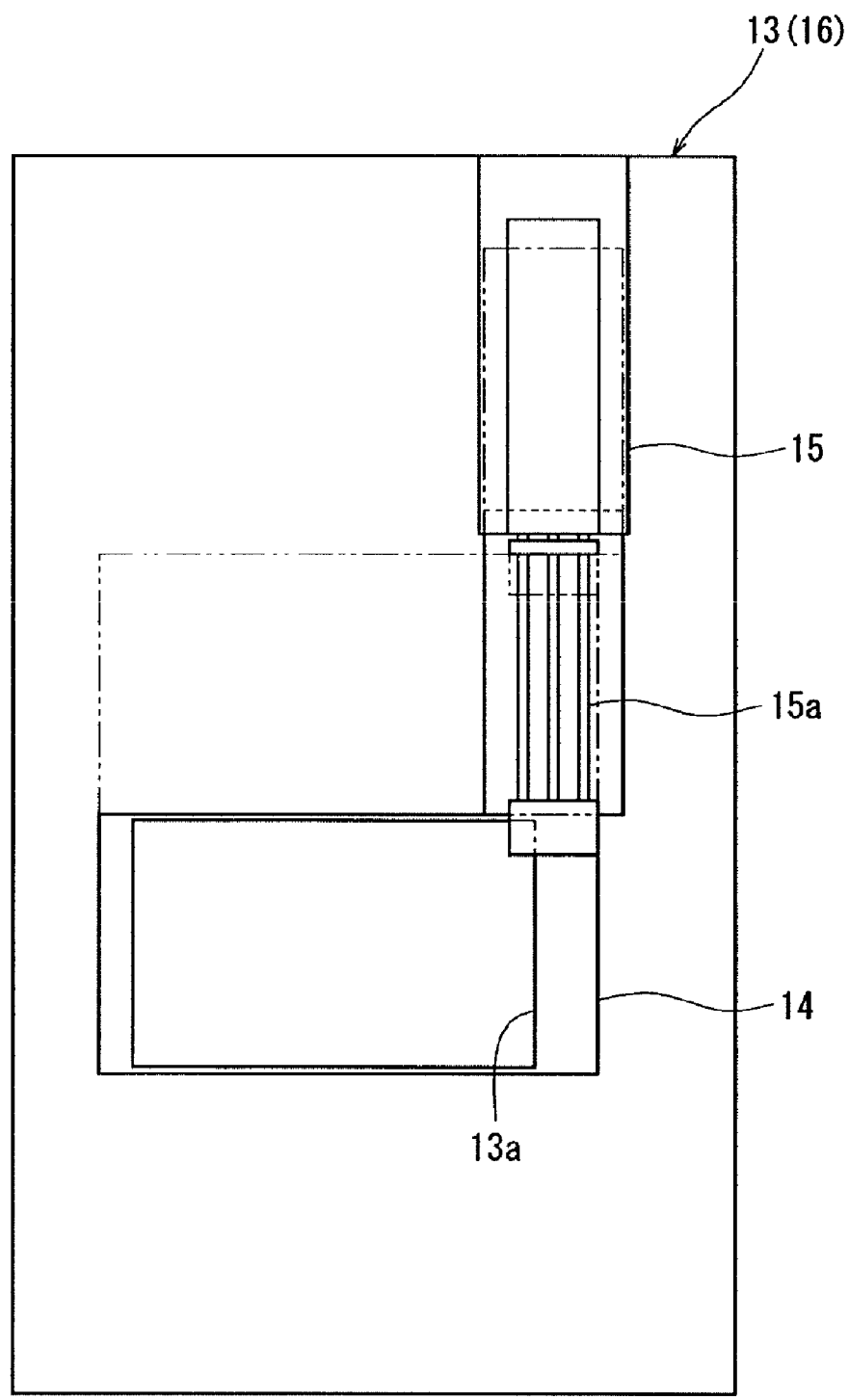
[FIG. 23] is a front view of when a partitioning wall (primer-coating portion and photochromic-coating portion) shown in FIG. 1 is viewed from the inside.

FIG. 23 shows a state where the partitioning wall 13 is viewed from the first main carrier portion 4a. A square opening 13a for carrying the lens 10 is formed in the partitioning wall 13 at a height nearly corresponding to the primer-coating device 65, and a shutter 14 is arranged in the opening 13a for carry so as to open and close the opening 13a for carry. The shutter 14 is supported by a cylinder 15 and can be moved up and down by the up-and-down motion of a rod 15a of the cylinder 15. The opening 13a for carry closes as the shutter 14 moves down, and opens as the shutter 14 moves up. With the opening 13a for carry being opened, the hand-over hand 64 of the first main carrier means 62 (see FIGS. 1 and 13) can be put into or out of the primer-coating portion 5 through the opening 13a for carry.

With the opening/closing door being arranged in the wall of the primer-coating portion 5 for carrying the lens in and out as described, it is made possible to minimize the fluctuation in the temperature and humidity therein and, therefore, to carry out the coating operation under nearly the uniform conditions.

Figure 22:
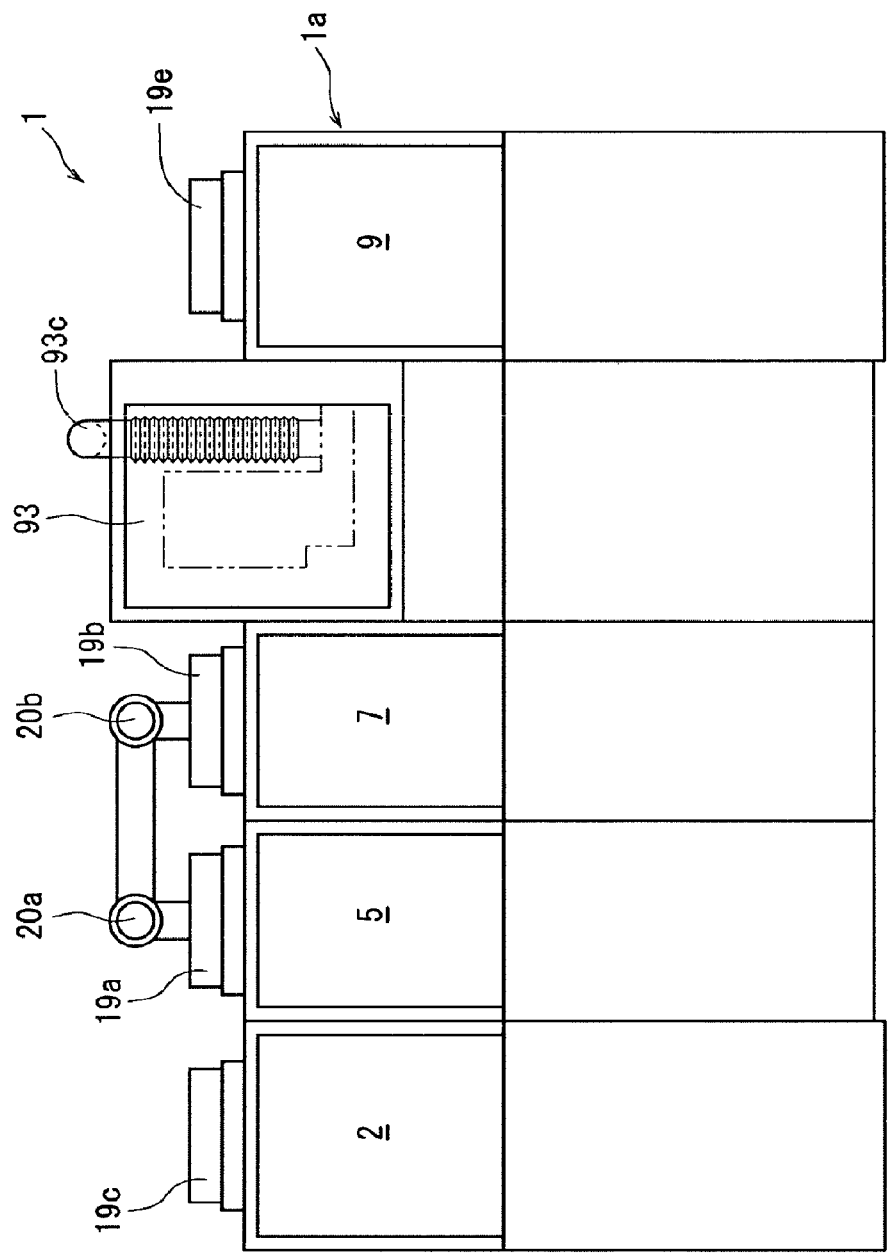
[FIG. 22] is a front view of the coating apparatus according to an embodiment of the invention.
Figure 24:
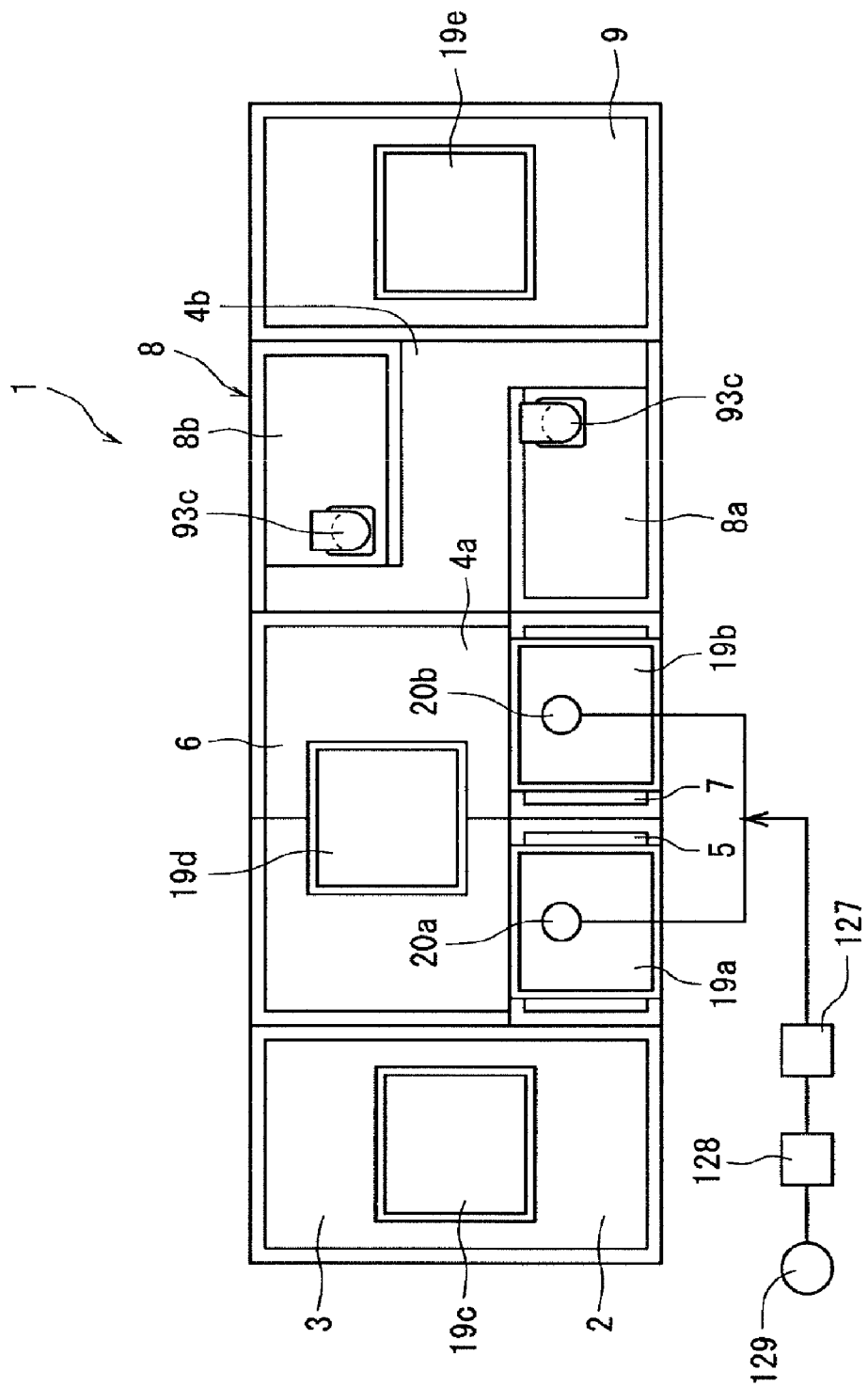
[FIG. 24] is a plan view of the coating apparatus according to the embodiment of the invention.
Figure 25:
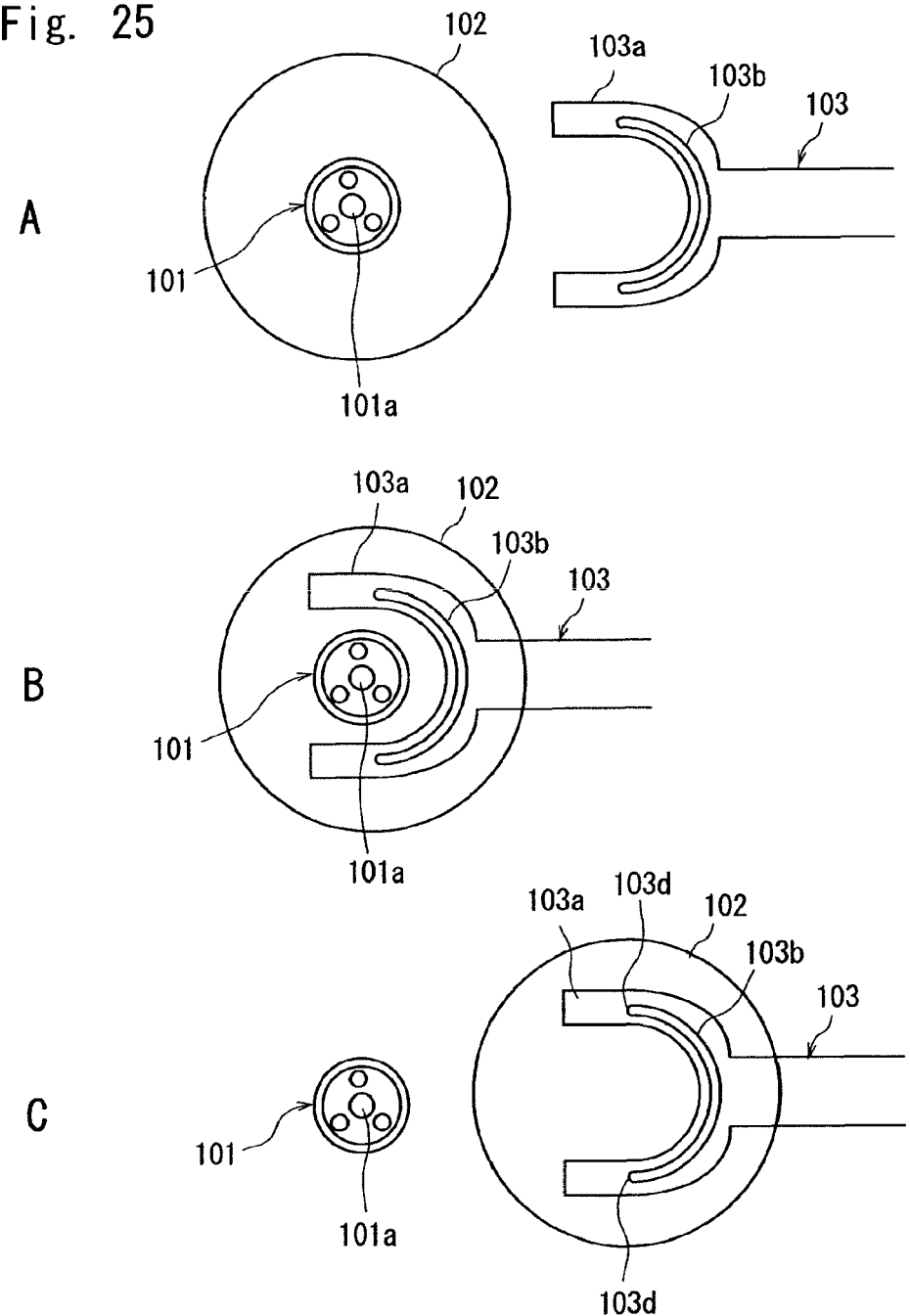
[FIG. 25] is a view illustrating the handing over of a lens by using a conventional hand-over hand, wherein A is a plan view illustrating a state where the spin shaft is supporting the lens, B is a plan view illustrating a state where hand-over hand is receiving the lens, and C is a plan view illustrating a state where the hand-over hand is supporting the lens.

Referring to FIGS. 22 and 24 which are plan views of the coating apparatus 1, a filter 19a, e.g., an HEPA (high efficiency particulate air) filter 19a is arranged on the ceiling portion of the primer-coating portion 5. An intake duct 20a is formed on the HEPA filter 19a. The HEPA filter 19a is arranged between the intake duct 20a and the primer-coating portion 5. To the intake duct 20a, there are connected, via connection ducts, a temperature-adjusting facility 127 for adjusting the temperature of the air fed to the primer-coating portion 5, a humidity-adjusting facility 128 for adjusting the humidity fed to the primer-coating portion 5, and an air-feed pump (pressure-feeding device) 129 for pressure-feeding the air adjusted through the temperature-adjusting facility 127 and the humidity-adjusting facility 128 to the primer-coating portion 5 through the intake duct 20a. The intake duct 20a, the temperature-adjusting facility 127 and humidity-adjusting facility 128 for adjusting the temperature and humidity of the air fed to the intake duct 20a, and the pressure-feeding device 129 for pressure-feeding the adjusted air, correspond to the temperature-adjusting means and humidity-adjusting means in the primer-coating portion 5 of the invention.

The temperature-adjusting means and humidity-adjusting means in the primer-coating portion 5 may be a single facility having a function of the intake duct 20a, functions of the temperature-adjusting facility 127 and humidity-adjusting facility 128 for adjusting the temperature and humidity of the air fed to the intake duct 20a, and a function of the pressure-feeding device 129 for pressure-feeding the adjusted air.

Next, the primer-coated lens is dried, i.e., a first intermediate product lens having an undried primer coating is dried.

In the drying portion 6 for drying the first intermediate product lenses 10 shown in FIG. 1, there are arranged many lens-support units having basically the same structure as that of the lens-support unit 58 of above-mentioned lens-measuring device 48, and the lens 10 is supported by four upstand pins 6a. The primer-coated lens 10 is carried by the first main carrier means 62 into the drying portion 6. The drying portion 6 is capable of drying a plurality of lenses 10.

The lens dried in the drying portion 6, i.e., a second intermediate product lens having a dry primer coating, is carried by the first main carrier means 62 into the photochromic-coating portion 7.

Figure 15:
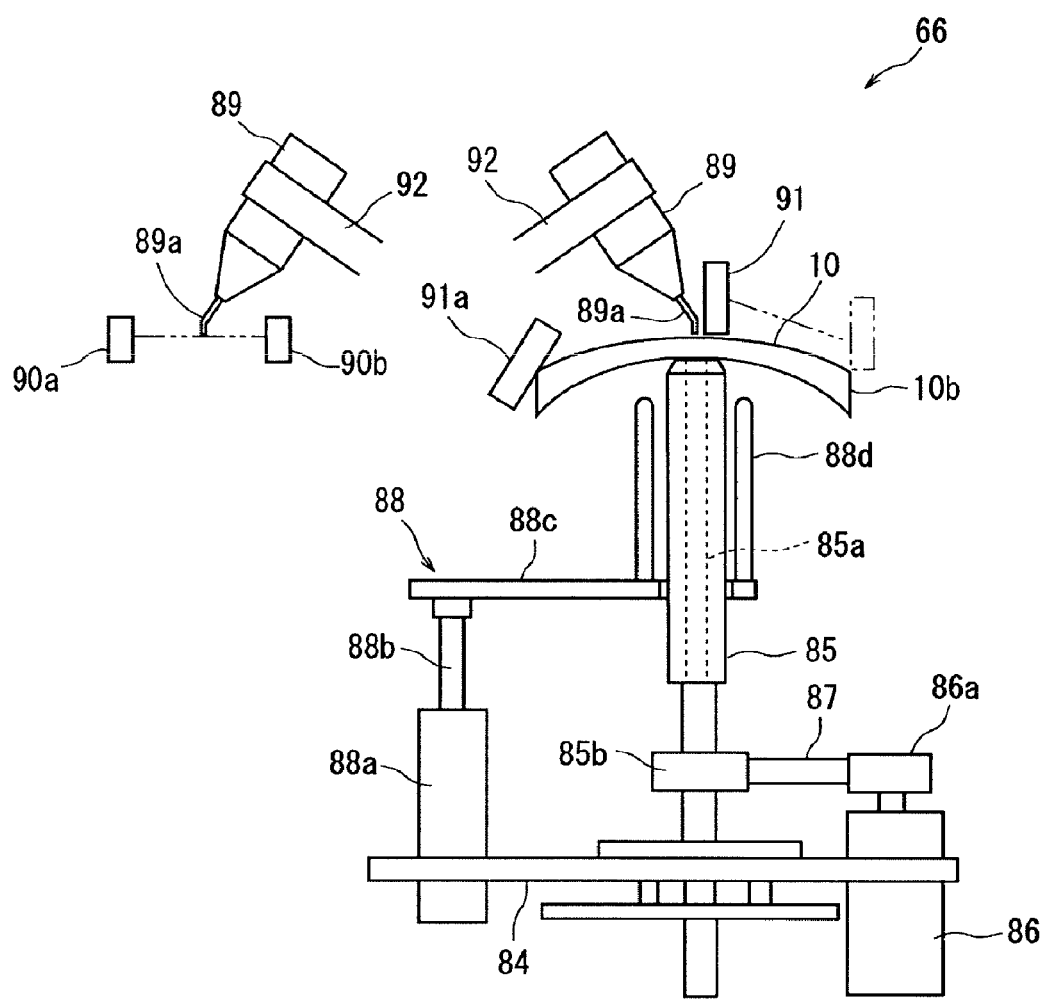
[FIG. 15] is a front view of a photochromic-coating device arranged in the photochromic-coating portion of FIG. 1.

In the photochromic-coating portion 7 shown in FIG. 1, there is arranged a photochromic-coating device 66 shown in FIG. 15 for coating the second intermediate product lens 10 with the photochromic coating solution. The photochromic-coating device 66 has a spin shaft 85 (support shaft) rotatably arranged on a base plate 84, and a pulse motor 86 attached thereto. A drive pulley 86a is attached to an upper part of the rotary shaft of the pulse motor 86 and is coupled, via a belt, 87 to a driven roller 85b arranged on the spin shaft 85. In the central portion of the spin shaft 85, there is formed a lens-adsorbing hole 85a communicated with air suction means that is not shown, and the bottom surface of the second intermediate product lens 10 is supported by the suction of the air. The spin shaft 85 corresponds to the support shaft of the invention.

The photochromic-coating device 66 is provided with a lens-support unit 88 for photochromic coating. The lens-support unit 88 for photochromic coating is supported by an air cylinder 88a mounted on the base plate 84. A lens-support plate 88c is attached to an end of an expansible rod 88b of the air cylinder 88a, and four pins 88d are upstanded upright on the upper surface of the lens-support plate 88c to form a lens-placing portion. Upon driving the air cylinder 88a, the lens-support plate 88c can be moved in the up-and-down direction. The upstand pins 88d have the same structure as the upstand pins 58d shown in FIGS. 9 and 10, and as the upstand pins 81d shown in FIG. 14, and are capable of temporary-supporting the lens 10. Upon moving the lens-support plate 88c up and down, the lens 10 can be handed over to, and received from, the spin shaft 85 (support shaft).

A barrel 89 is provided over the spin shaft 85 (support shaft) to apply a photochromic coating solution onto the lens 10. The photocoating coating solution is applied from a nozzle 89a formed at an end of the barrel 89. Further, the photochromic-coating device 66 is provided with height sensors 90a and 90b at places separated away from the spin shaft 85 to measure the lower end position of the nozzle 89a of the barrel 89. Though not shown, a drip-preventing valve (check valve) may be provided between the barrel 89 and the nozzle 89a, so that the coating solution will not be blown out unless pressurized.

The photochromic-coating portion 7 shown in FIG. 1 has its side walls partitioned by partitioning walls 11b and 11c made of a metal such as a stainless steel, a transparent glass or a transparent synthetic racing the front wall being partitioned by an opening/closing door 12b that can be opened and closed, and the rear wall on the side of the first main carrier means 62 being partitioned by a partitioning wall 16.

The partitioning wall 16 has the same constitution as the partitioning wall 13 shown in FIG. 23 and will, therefore, be described with reference to FIG. 23. A square opening 13a for carrying the lens 10 is formed in the partitioning wall 16 at a height nearly corresponding to the photochromic-coating device 66, and a shutter 14 is arranged in the opening 13a for carry so as to open and close the opening 13a for carry. The shutter 14 is supported by a cylinder 15 and can be moved up and down by the up-and-down motion of a rod 15a of the cylinder 15. The opening 13a for carry closes as the shutter 14 moves down, and opens as the shutter 14 moves up. With the opening 13a for carry being opened, the hand-over hand 64 of the first main carrier means 62 can be put into or out of the photochromic-coating portion 7 through the opening 13a for carry.

With the opening/closing door being arranged in the wall of the photochromic-coating portion 7 for carrying the lens in and out as described, it is made possible to minimize the fluctuation in the temperature therein and, therefore, to carry out the coating operation under nearly uniform conditions.

Referring to FIGS. 22 and 24, an HEPA filter 19b is arranged on the ceiling portion of the photochromic-coating portion 7. An intake duct 20b is formed on the HEPA filter 19b. The HEPA filter 19b is arranged between the intake duct 20b and the photochromic-coating portion 7. To the intake duct 20b, there are connected, via connection ducts, the temperature-adjusting facility 127 for adjusting the temperature of the air fed to the photochromic-coating portion 7 and the air-feed pump (pressure-feeding device) 129 for pressure-feeding the air adjusted through the temperature-adjusting facility 127 to the photochromic-coating portion 7. The intake duct 20b, the temperature-adjusting facility 127 for adjusting the temperature of the air fed to the intake duct 20b, and the pressure-feeding device 129 for pressure-feeding the adjusted air, correspond to the temperature-adjusting means in the photochromic-coating portion 7 of the invention.

The temperature-adjusting means in the photochromic-coating portion 7 may be a single facility having a function of the intake duct 20b, a function of the temperature-adjusting facility 127 for adjusting the temperature of the air fed to the intake duct 20b, and a function of the pressure-feeding device 129 for pressure-feeding the adjusted air. The facility may further have a function for adjusting the humidity.

FIG. 24 illustrates that the air fed to the intake duct 20b connected to the photochromic-coating portion 7 has been adjusted in the same manner as the air fed to the intake duct 20a connected to the primer-coating portion 5. This embodiment makes it possible to share the temperature-adjusting facility 127. Further, within a range of humidity in the primer-coating portion 5 that will be described below in detail, the photochromic-coating processing is not adversely affected. Therefore, the embodiment shown in FIG. 24 makes it possible to share the pressure-feeding device 129 for pressure-feeding the air. Further, the single facility having the intake ducts 20a and 20b, as well as the temperature-adjusting function, humidity-adjusting function and function for pressure-feeding the air, can be efficiently shared by the primer-coating portion 5 and the photochromic-coating portion 7.

Here, if the temperature has been adjusted, the air fed to the photochromic-coating portion 7 may be the one which is different from the air fed to the primer-coating portion 5.

Referring to FIG. 24, an HEPA filter 19c may be arranged on the ceiling wall of the lens-measuring portion 3 in the body 1a of the coating apparatus 1, an HEPA filter 19d may be arranged on the ceiling wall between the first main carrier portion 4a and the lens-drying portion 6, and an HEPA filter 19e may be arranged on the ceiling wall of the product lens storage portion 9.

The photochromic-coated lens obtained through the photochromic-coating portion 7, i.e., the third intermediate product lens having an uncured photochromic coating is carried to a third intermediate product lens temporary-placing portion 74 by the first main carrier means 62, and is carried to the UV irradiation portion 8a or 8b or, more concretely, to the UV device 70 or 71 arranged in each of the portions by the second main carrier means 67 arranged in the second main carrier portion 4b. The third intermediate product lens temporary-placing portion 74 may, for example, be constituted by using four upstand pins to support the outer circumferential portion of the lens 10. The four upstand pins in the third intermediate product lens temporary-placing portion 74 correspond to the lens-placing portion on where the third intermediate product lens is temporary-placed at the time of handing the third intermediate product lens from the first main carrier means 67 over to the second main carrier means 67.

The second main carrier means 67 has a hand-over hand 69 attached to an end of the arm 68 so as to rotate. The second main carrier means 67 has the structure basically the same as the first main carrier means 62, and is not described here in detail. The hand-over hand 69 of the second main carrier means 67 works to hand the lens 10 over to, or receives the lens 10 from, the spin shaft 97a of the UV device 70 (or 71). The spin shaft 97a corresponds to the support shaft of the invention.

Figure 16:
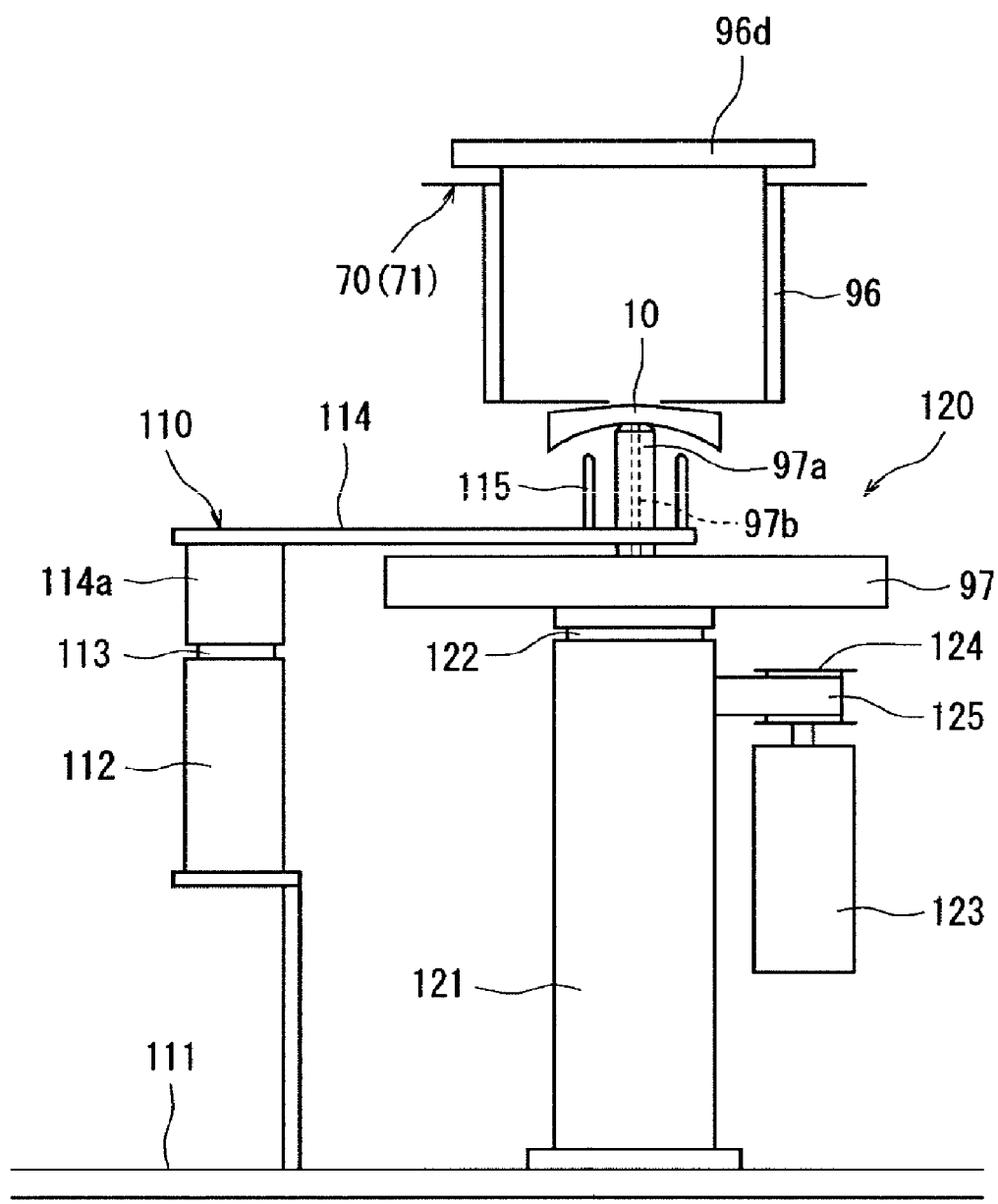
[FIG. 16] is a front view of a lens hand-over portion arranged in the UV irradiation portion of FIG. 1.

FIG. 16 illustrates a device (stage lift unit 120) for handing over or receiving the lens 10 between the second main carrier means 67 and the spin shaft 97a (support shaft) of the UV device 70. A lens support unit 110 for UV irradiation is provided under the UV device 70, and is supported by an air cylinder 112 mounted on a base plate 111. A lens-support plate 114 is attached to an end of an expansible rod 113 of the air cylinder 112, and four pins 115 are upstanded upright on the upper surface of the lens-support plate 114 to form a lens-placing portion. The lens-support plate 114 moves up and down being driven by the air cylinder 112. The upstand pins 115 have the same structure as the upstand pins 58d shown in FIGS. 9 and 10 and as the upstand pins 81d shown in FIG. 14, permit the lens 10 to be temporary-placed thereon, and work to hand the lens 10 over to, or receive the lens 10 from, the spin shaft 97a (support shaft) as the lens-support plate 114 moves up and down. After the lens 10 is handed over to the spin shaft 97a (support shaft), the lens-support plate 114 undergoes the horizontal movement due to the air cylinder 114a for turning so that the upstand pins 115 are not present under the lens 10. Therefore, when a stage 97 described below is lifted up, a lens-holding chamber 96 is constituted in a compact size. Here, the spin shaft 97a corresponds to the support shaft of the invention.

Figure 17:
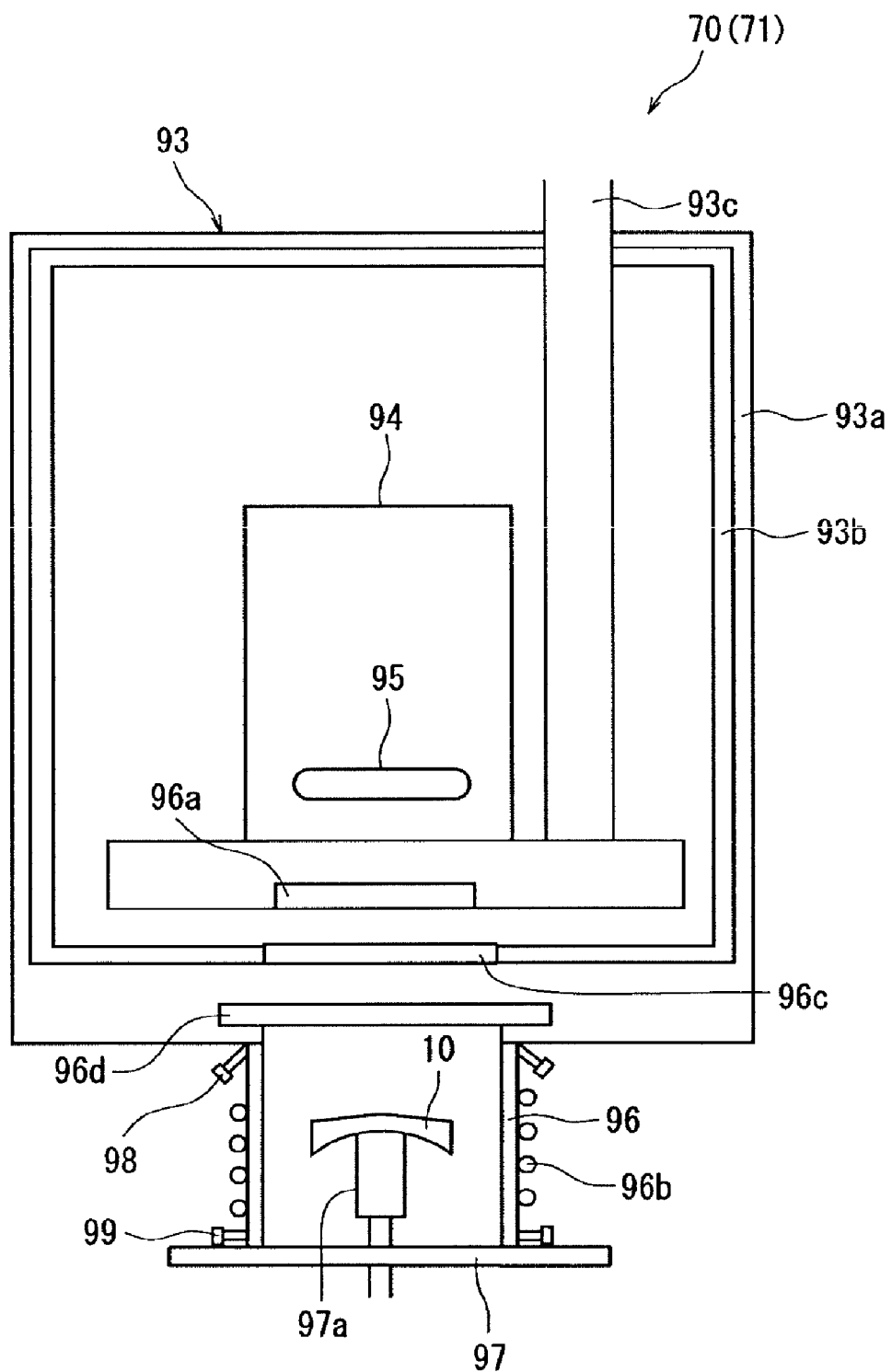
[FIG. 17] is a front view of an ultraviolet ray irradiation chamber arranged in the UV irradiation portion of FIG. 1.

FIG. 17 illustrates the UV device 70. The UV device 70 is provided with an ultraviolet ray irradiation chamber 93 which has a light-shielding cover 93a arranged on the outer side. A heat-insulating member 93b is arranged on the inside of the light-shielding cover 93a. An exhaust duct 93c is connected to the ultraviolet ray irradiation chamber 93. A UV unit 94 is arranged in the ultraviolet ray irradiation chamber 93, and a UV lamp 95 is arranged in the UV unit 94.

A lens-holding chamber 96 made of a stainless steel is arranged under the UV device 70, and the stage lift unit 120 (FIG. 16) is arranged under the lens-holding chamber 96. The stage lift unit 120 is provided with a pair of air cylinders 121 arranged on the upper surface of a base plate 111 maintaining a gap. Expansible rods 122 are provided at the upper ends of the air cylinders 121, and a stage 97 is mounted on the upper ends of the pair of rods 122 and can be moved up and down accompanying the expansion and contraction of the rods 122. The spin shaft 97a is supported on the stage 97 so as to rotate. The stage 97 is, further, provided with a drive motor 123. A drive pulley 124 is attached to the drive motor 123, and a belt 125 is wound round the drive pulley 124. The belt 125 is wound round a driven pulley that is not shown attached to a lower part of the spin shaft 97a passing through between the pair of air cylinders 121, and causes the spin shaft 97a to rotate being driven by the drive motor 123. A suction hole 97a is formed in the central portion of the spin shaft 97a to suck the lens 10. The suction hole 97a is connected to air suction means that is not shown.

A gas feed port 98 is provided at an upper part of the lens-holding chamber 96 to introduce an $N_2$ gas which is an inert gas into the lens-holding chamber 96. The gas $N_2$ is exhausted through a gas exhaust port 99 provided at a lower part of the lens-holding chamber 96. A window 96c made of a borosilicate glass for transmitting UV rays is provided at an upper part of the lens-holding chamber 96. It is desired to arrange the window 96c having at least a piece of borosilicate glass between the UV lamp 95 and the lens 10 as described above. Here as shown in FIG. 17, quartz glass windows 96a and 96d may be arranged over and under the borosilicate glass window 96c. The lens-holding chamber 96 is surrounded by a cooling pipe 96b wound like a coil, and the cooling water is circulating in the cooling pipe 96b.

Next, the lens 10 (product lens) treated through the UV device 70 is carried by the second main carrier means 67 to the product lens temporary-placing portion 72 arranged on the side of the product lens storage portion 9. Like the third intermediate product lens temporary-placing portion 74, the product lens temporary-placing portion 72 may be constituted by four upstand pins 72a to support the outer circumferential portion of the lens 10. Here, at the time when the product lens is to be handed over to the second lens sub-carrier means 73 that will be described below from the second main carrier means 67, the upstand pins of the product lens temporary-placing portion 72 correspond to the lens-placing portion on where the product lens is temporary-placed. At the time when the lens 10 (product lens) is to be handed over to the second lens sub-carrier means 73 from the second main carrier means 67, the four upstand pins of the product lens temporary-placing portion 72 correspond to the lens-placing portion on where the product lens is to be temporary-placed.

In the coating apparatus 1 shown in FIG. 1, the product lens storage portion 9 is arranged at a position downstream of the coating line in the apparatus body 1a. The product lens storage portion 9 is not an essential requirement. Upon providing the storage portion 9, however, a plurality of product lenses that have been coated can be taken out of the apparatus body 1 at one time to improve the working efficiency.

In the product lens storage portion 9, there are arranged product lens-holding units 75 and a second lens sub-carrier means 73 for carrying the product lens from the coating line to the product lens-holding units 75. The second lens sub-carrier means 73 is provided with a lens-support unit (designated at 45) having the same structure as the lens-support unit 45 of the first lens sub-carrier means 31.

The product lens-holding units 75 and 75 have the same structure as the starting lens-holding units 22 and 22 described with reference to FIGS. 2 to 4, and are not described here in detail. In a state where the product lens-holding units 75 and 75 are set to the coating apparatus 1, the lens support unit 4 moves the direction toward the lens-placing portion 75a. An open portion (see the open portion 25c in FIGS. 2 and 3) is formed in the lens-placing portion 75a enabling the lens-support unit 45 to pass through in the up-and-down direction. Further, the product lens-holding units 75 and 75 may be provided being fixed in the coating apparatus 1 or may be removably provided. When removably provided, the plurality of coated lenses can be taken out of the coating apparatus 1 at one time.

The second lens sub-carrier means 73 can receive the lens 10 from the product lens temporary-placing portion 72, and carries the lens 10 to the product lens-holding units 75 and 75. The structure of the second lens sub-carrier means 73 is the same as that of the first lens sub-carrier means 31 shown in FIGS. 5 and 6, and is not described here in detail.

The coating apparatus 1 is provided with a control unit for controlling various units and for measuring the timing for suitably receiving or handing over the lens 10. In the coating apparatus of the invention, further, the pulse motors may be servo motors.

Next, described below is the action of the embodiment of the invention.

Figure 18:
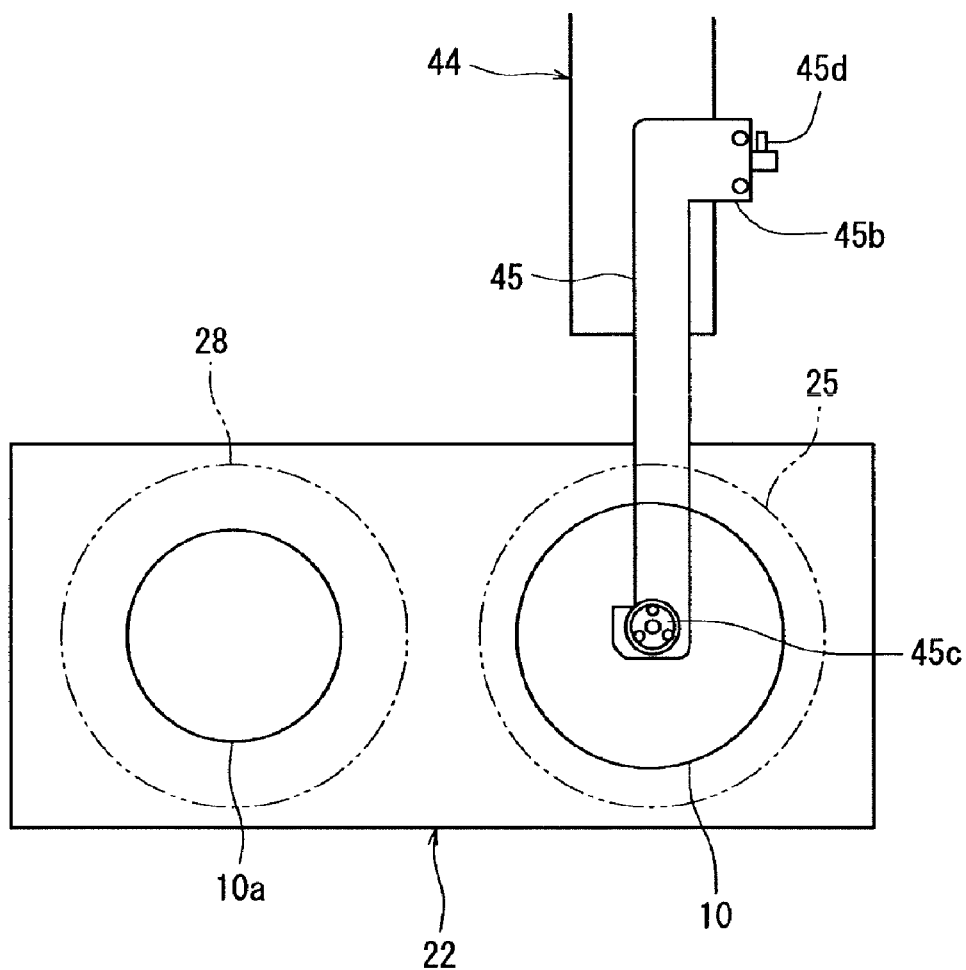
[FIG. 18] is a plan view illustrating, on an enlarged scale, a lens-holding unit and a lens-support unit in the coating apparatus shown in FIG. 1.

First, the lenses 10 are set onto the lens-placing portions 25 to 30 of the starting lens-holding units 22 and 22 shown in FIGS. 2 and 3. In this case as shown in FIG. 18, lenses 10 and 10a having different diameters can be placed and arranged in a random fashion, i.e., are placed on predetermined steps d1 to d5 (see FIG. 4) corresponding to the lens-placing portion 25. The lens 10 is centered upon being fitted to any one of the steps d1 to d5 that meets the outer diameter thereof.

When the starting lens-holding units 22 and 22 are arranged being fixed to the coating apparatus 1, the opening/closing door 21a is opened, the lenses are placed on the lens-placing portion 25 and, thereafter, the opening/closing door 21a is closed. When the starting lens-holding units 22 and 22 are removed, the plurality of lenses are placed at one time on the starting lens-holding units 22 and 22 on the outside of the coating apparatus 1, the lens-holding units 22 and 22 are arranged in the apparatus 1 and are fixed by using a separate member, and the opening/closing door 21a is closed.

Next, the coating apparatus 1 starts operating.

Referring to FIGS. 5 and 6, in the coating apparatus 1, the slide unit 37 moves in the X-axis direction of the X-axis guide unit 32 of the first lens sub-carrier means 31 up to just before the starting lens-holding unit 22. Here, the end of the lens-support unit 45 for sub-carrier means of the slide unit 43 so turns as to face the starting lens-holding unit 22, as the slide unit 43 moves together with the slide unit 37, and the lens-adsorbing portion 45c of the lens support unit 45 for sub-carrier means is arranged on the side lower than the position of the starting lens 10 that is going to be supported according to the instruction from the control unit. The lens-support unit 45 for sub-carrier means is moved forward to arrange the lens-adsorbing portion 45c just under the central portion of the starting lens 10 as shown in FIG. 18. The lens-support unit 45 for sub-carrier means is lifted up by driving the Z-axis unit 38, and the lens 10 (starting lens) is supported by the lens-adsorbing portion 45c by the suction of the air.

Referring to FIG. 3, the lens-placing portions 25 to 30 are split into right and left two sides thereby forming the open portion 25c. Therefore, the lens-support unit 45 is allowed to pass therethrough up and down or back and forth.

In a state where the lens 10 is supported by the lens-support unit 45 for sub-carrier means, the lens-support unit 45 for sub-carrier means is moved back, is rotated so that the end thereof moves forward as shown by a two-dot chain line in FIG. 5, and is moved up to just before the Y-axis guide unit 49 as shown in FIG. 9. Thereafter, as shown in FIG. 19A, the lens-adsorbing portion 45c of the lens-support unit 45 for sub-carrier means is arranged just over the central portion of the four upstand pins 58d (lens-placing portion) of the lens-support unit 58 for measurement.

Figure 19:
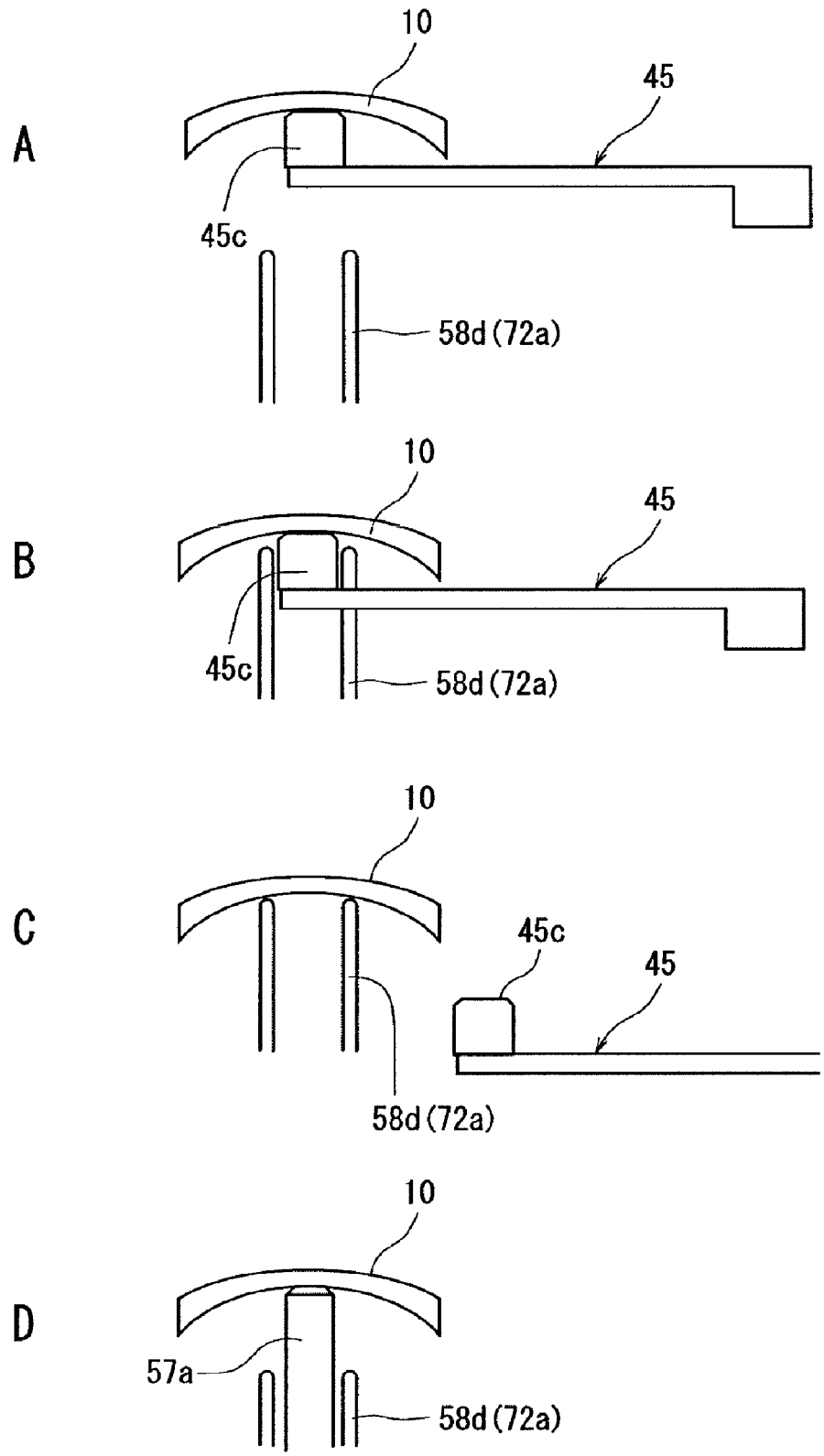
[FIG. 19]A is a side view illustrating a state where a lens-support unit is arranging the lens just over the pins, B is a side view illustrating a state where lens-support unit has placed the lens on the pins, C is a side view illustrating a state where the lens-support unit has moved back and separated away from the pins, and D is a side view illustrating a state where a centering rod is supporting the lens.

Referring, next, to FIGS. 19B and 19C, the lens-adsorbing portion 45c is lowered in a state where the upstand pins 58d are being lifted up to the highest position, so that the lens 10 is placed on the upstand pins 58d; i.e., the lens 10 is handed over to the upstand pins 58d of the lens-support unit 58 for measurement from the lens-support unit 45 for sub-carrier means. Thereafter, as shown in FIG. 19C, the lens-support unit 45 for sub-carrier means is moved back and, further, the upstand pins 58d are lowered so that the lens 10 is supported on the end of the centering rod 57a (support shaft) of the lens-support unit 58 for measurement. This completes the carriage of the starting lens from the starting lens-feeding portion 2 to the lens-measuring portion 3. Thereafter, the lens-support unit 45 for sub-carrier means moves toward the starting lens-holding units 22 and 22 for taking out the next starting lens 10.

Referring to FIGS. 10 to 12, in the lens-measuring device 48, the laser beam-projecting portion 60 and the laser beam-receiving portion 61 are arranged on both sides of the centering rod 57a (support shaft) which has the lens 10 fixed to the end thereof. The outer diameter, curvature and height of the lens are measured as the centering rod 57a passes through the measuring area a. As the lens 10 is placed between the laser beam-projecting portion 60 and the laser beam-receiving portion 61, i.e., placed in the measuring area a, light is shut out by the lens 10 enabling the length the light is shut out (or the length the light is not shut out) to be measured. The centering rod 57a is capable of rotating and moving straight, and the lens-measuring device 48 is capable of specifying the rotational angle and the amount of linear motion of the centering rod 57a, and of obtaining the present values thereof.

Described below with reference to FIGS. 12A and 12B is how to measure the outer diameter of the lens 10. First, the centering rod 57a is moved, and the distance (A) which the centering rod 57a has moved is measured at a moment when the end of the lens 10 has entered the measuring area a (FIG. 12A). Next, the centering rod 57a is moved, and the distance (B) which the centering rod 57a has moved is measured at a moment when the end of the lens 10 has gone out of the measuring area a (FIG. 12B). The outer diameter of the lens 10 are found by subtracting the moved distance (A) from the moved distance (B).

Described below is how to measure the height of the lens 10. First, the center of the centering rod 57a is moved into the measuring area in a state where no lens 10 has been fixed to the end of the centering rod 57a (in a state of the centering rod 57a only) (FIG. 11A). At this moment, a value the light is shut out in the direction of height is measured as a reference value (S). Next, the center of the centering rod 57a is moved into the measuring area a in a state where the lens 10 is fixed to the end of the centering rod 57a. At this moment, a value (T) the light is shut out in the direction of height is measured, and the thickness of the lens 10 is found by subtracting the reference value (S) from the value (T). The number of times of measuring the height (T) of the lens 10 at the center thereof can be arbitrarily set. If the number of times of measurement is N, the centering rod 57a to which the lens 10 is fixed is rotated every (360/N) to measure the height (T) of the lens 10 at the center thereof.

Described below is how to measure the curvature of the lens 10. First, the center of the centering rod 57a (support shaft) having the lens 10 fixed to the end thereof is moved into the measuring area a (FIG. 11B). Next, the centering rod 57a is moved by a given distance (X) (X is a distance shorter than the radius of the lens, see FIG. 12C), and the height (U) of the lens 10 at that position is measured (see FIG. 11C). The number of times of measuring the height (U) of the lens 10 can be arbitrarily set like the height (T) of the lens 10 at the center thereof. The difference in the height between the central portion of the lens and the outermost circumference of the lens, and the curvature of the lens, are found from the height (U) of the lens 10, height (T) of the lens 10 at the center thereof, outer diameter of the lens 10 and refractive index of the lens.

Upon finding the height of the lens 10, the lens 10 can be brought to the height of the coating solution exhaust nozzles (not shown) of the primer-coating device 65 and of the photochromic-coating device 66. Further, preset coating conditions are selected from such conditions as the curvature of the lens, atmospheric temperature, etc. The position to start blowing out the primer coating solution through the nozzle 82a and the position to start blowing out the photochromic coating solution through the nozzle 89a are determined from the values set under the coating conditions and from the thickness of the lens. The photochromic coating solution is viscous and must be spread toward the outer circumferential side of the lens 10. Here, the position to start moving the film to spread the photochromic coating solution is determined from the values set under the coating conditions and the thickness of the lens. Further, the position to start blowing out the primer coating solution through the nozzle 82a, the position to end the blow out, the position to start moving the film to apply the photochromic coating and the position to end the moving, are determined from the values set as the coating conditions, outer diameter of the lens, thickness of the lens, and difference in the height between the center of the lens and the outermost circumference thereof.

So far, the operator instructed the lens diameter to the control unit of the coating apparatus by using a switch or the like. This embodiment, however, obviates the above kind of work.

Therefore, the outer diameter, curvature and height of the lens 10 measured above serve as reference data and are used as the coating conditions for the primer-coating device 65 and the photochromic-coating device 66 in the steps on the downstream.

After the lens 10 has been measured for its shape, the upstand pins 58d forming the lens-placing portion are moved up as shown in FIG. 20B in a state where the lens 10A has been supported on the end of the centering rod 57a (support shaft) as shown in FIG. 20A, and the lens 10 is handed over to the upstand pins 58d from the centering rod 57a (support shaft). The arm 63 of the first main carrier means 62 is moved to a position just before the lens 10, one of the adsorbing portions 64a, 64a at the end thereof is arranged under the lens 10 by the hand-over hand 64, the adsorbing portions 64a, 64a are moved up as shown in FIG. 20C, and the lens 10 is supported by one adsorbing portion 64a. Thereafter, the arm 63 is rotated and the slide unit 76 is moved to carry the hand-over hand 64 to the primer-coating device 65.

During the primer-coating operation in the primer-coating portion 5, the opening 13a for carry is closed with the shutter 14 shown in FIG. 23, and is opened at the time of carrying the lens 10 in and out. Therefore, if the hand-over hand 64 moves to just before the shutter 14, the shutter 14 moves up being driven by the cylinder 15, and the opening 13a for carry is opened.

In the primer-coating device 65, the lens 10 is handed over to the spin shaft 78 (support shaft) of the primer-coating device 65 from the adsorbing portion 64a of the first main carrier means 62. A typical procedure for handing over will now be described. First, as shown in FIG. 22A, the absorbing portion 64a supporting the lens 10 is arranged just over the upstand pins 81d (lens-placing portion) which are at their highest point and over the spin shaft 78 (support shaft). Referring, next, to FIG. 21B, the adsorbing portion 64a is lowered to place the lens 10 on the upstand pins 81d. Referring to FIG.

21C, after the hand-over hand 64 has moved back, the upstand pins 81d are lowered so that the bottom surface of the lens 10 comes in contact with the end of the spin shaft 78. Referring to FIG. 21D, further, the upstand pins 81d are lowered, and the lens 10 is supported by the spin shaft 78.

Here, the hand-over hand 64 is provided with the pair of adsorbing portions 64a. Namely, after the second and subsequent times, the one adsorbing portion 64a which is not supporting the lens 10 on the spin shaft 78 (support shaft) receives the lens 10 that has been coated, and the other adsorbing portion 64a carries the new lens 10 of before being coated and feeds it to the spin shaft 78.

After the lens 10 has been handed over, the hand-over hand 64 is returned back to the first main carrier portion 4a, and the opening 13a for carry is closed with the shutter 14.

In the primer-coating device 65 as shown in FIG. 14, the primer coating is effected while moving the nozzle 82a from the central portion of the starting lens 10 toward the outer circumferential portion 10b of the lens 10 while rotating the pulse motor 79 and rotating the starting lens 10 by drive means that is not shown. The primer coating solution uniformly spreads over the whole surface of the lens 10 due to the centrifugal force produced by the rotation of the lens 10. The spinning conditions (rotational speed, time, gradient or rise in the rotational speed) are determined by taking the outer diameter, curvature and height of the lens 10 into consideration. The nozzle 82a must be moved from the central portion of the lens 10 through up to the outer circumferential portion 10b thereof. So far, the operator confirmed the diameter of the lens and instructed the diameter of the lens to the control unit of the coating apparatus by using a switch or the like. This embodiment, however, obviates the above work.

In applying the primer coating solution onto the lens 10, mist generates accompanying the rotation of the lens 10. However, the primer-coating device 65 is provided with the primer cup 100, and the interior of the intake duct 134 is sucked by a suction pump that is not shown (see FIG. 14). In this embodiment, the intake duct 134 is formed to meet the height of the lens 10, and the flow of the air containing mist can be more effectively formed in the intake duct 134 (passage formed by the upper cup 131 and the middle cup 132). The mist flows as indicated by an arrow b, and the liquid thereof is exhausted through a primer drain 137 and is stored in a storage tank that is not shown, while the air is exhausted through an exhaust port 138 by suction means that is not shown. Thus, the mist is exhausted out of the primer cup 100 and is prevented from adhering again on the lens 10, making it possible to form a coating of high quality.

During the primer-coating operation, further, the lens-support portion 81 is arranged at a position lower than the positions of the intake duct 134 and the cylindrical member 133a, preventing the mist from adhering on the upstand pins 81d, so that the subsequent operation for supporting the lens 10 will not be affected.

The primer-coating portion 5 has been partitioned though not completely sealed. Therefore, the pressure therein becomes negative as the air is sucked by the suction pump, and the air may infiltrate therein from the exterior and, therefore, dust may also infiltrate. In this embodiment, however, the air is fed into the primer-coating portion 5 through the intake duct 20a. Upon setting the amount of the air fed through the intake duct 20a to be larger than the amount of the air sucked by a suction pump that is not shown, the pressure does not become negative in the primer-coating portion 5, the air does not flow into the primer-coating portion 5 from the interior of the apparatus body 1a, and cleanness is maintained. Further, the air favorably flows in the primer-coating portion 5, and the mist is smoothly exhausted. The air entering into the primer-coating portion 5 from the intake duct 20a should be prevented from being directed toward the spin shaft 78.

In the primer-coating portion 5, it is desired that the temperature is maintained in a range of 20 to 23° C. and the humidity is maintained in a range of 45 to 55%. Upon adjusting the temperature and the humidity to lie in the above ranges, the primer-coating operation can be stably carried out. The temperature and humidity in the primer-coating portion 5 are adjusted by pressure-feeding the air therein by using the air-feed pump (pressure-feeding device) 129 after the temperature of the air is adjusted through the temperature-adjusting facility 127 and the humidity of the air is adjusted through the humidity-adjusting facility 128. The adjusted air is fed into the primer-coating portion 5 from the intake duct 20a through the HEPA filter 19a, having the temperature and humidity lying in the above-mentioned ranges. In the primer-coating portion 5 as described above, the primer-coating operation is carried out under the conditions suited for forming the primer coating. Upon adjusting the temperature in the primer-coating portion 5 to lie in the above range, the thickness of the primer coating can be controlled to become constant, and the thickness of the primer coating after dried can be controlled to be ±1 μm. Upon adjusting the humidity to lie in the above range, further, the rate of curing the primer coating can be maintained constant minimizing the occurrence of defective products which become the cause of defective primer coating. If the temperature lies outside the above temperature range, about 10% of the products may often become defective. If the humidity lies outside the above range, further, about 50% of the products may often become defective.

As described above, the primer-coating portion 5 does not have to be air-tight but may be such that the interior thereof can be adjusted to lie within the preset temperature range and the preset humidity range. The adjusted air that is taken in is exhausted through the gaps of the primer-coating portion 5 and through the exhaust facility arranged in the primer-coating portion 5.

Though not diagrammed, it is desired to arrange a stand-by vessel to prevent the end of the nozzle 82a of the primer coating solution from drying. The stand-by vessel stores a solvent. When the nozzle 82a is not in operation, the end of the nozzle 82a is dipped in the solvent to prevent the primer-coating solution from drying or curing. The stand-by vessel is arranged within a range in which the nozzle 82a moves.

After the primer-coating operation has been finished, the lens 10 (first intermediate product lens) is carried by the first main carrier means 62 to the drying portion 6. In this case, the lens 10 is handed from the spin shaft 78 (support shaft) over to the adsorbing portion 64a of the hand-over hand 64 through a procedure opposite to that shown in FIGS. 21A to 21D. Namely, the lens 10 after having been coated with the primer is placed on the upstand pins 81d (lens-placing portion) and, next, the adsorbing portion 69a is arranged just under the central portion of the lens 10. Thereafter, the adsorbing portion 64a moves up so as to support the lens 10. Here, the height of the spin shaft 78 (support shaft) of the primer-coating device 65 remains unchanged.

The drying portion 6 dries the primer coating solution on the lens 10 (first intermediate product lens). The procedure for handing the lens over to the drying portion 6 is such that the lens 10 is carried by the first main carrier means 62 and is placed on the upstand pins 6a from the adsorbing portion 64a. In this case, the adsorbing portion 64a moves up and down to place the lens 10 on the upstand pins 6a. The conditions in the drying portion 6 may be suitably determined depending upon the composition of the primer coating solution and the thickness of the coating. The drying portion 6 is capable of drying a plurality of lenses 10.

After the primer coating solution has been dried, the lens 10 is carried by the first main carrier means 62 to the photochromic-coating portion 7.

The second intermediate product lens which is the lens 10 having the dried primer coating is carried by the first main carrier means 62 to the photochromic-coating portion 7. The partitioning wall 13 in the primer-coating portion 5 has the same structure as the partitioning wall 16 in the photochromic-coating portion 7. Therefore, FIG. 23 will now be referred to. During the photochromic-coating operation, the opening 13a for carry is closed with the shutter 14 disposed in the partitioning wall 16. The opening 13a for carry is opened at the time of carrying the lens 10 in and out. Therefore, as the hand-over hand 64 moves to just before the shutter 14, the shutter 14 moves up being driven by the cylinder 15, and the opening 13a for carry is opened.

Figure 21:
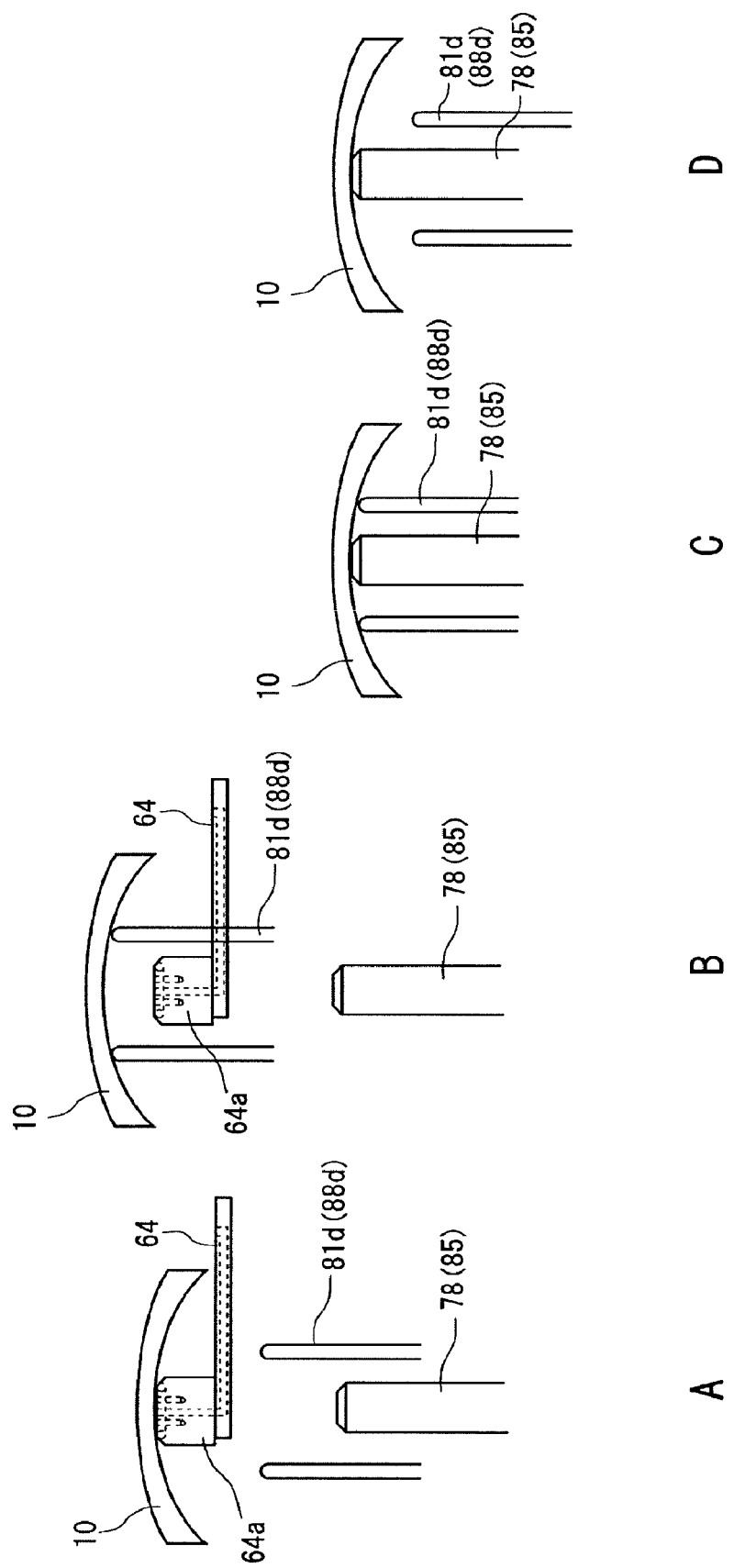
[FIG. 21]A is a side view illustrating a state where the adsorbing portion of the hand-over hand is supporting the lens, B is a side view illustrating a state where the upstand pins have received the lens from the adsorbing portion of the hand-over hand, C is a side view illustrating a state at the time when the lens is handed from the upstand pins over to the spin shaft, and D is a side view illustrating a state where the spin shaft is supporting the lens.

The lens 10 (second intermediate product lens) is handed from the adsorbing portion 64a of the first main carrier means 62 over to the spin shaft 85 (support shaft) of the photochromic-coating device 66 in the same manner as receiving and handing over the lens 10 between the adsorbing portion 64a and the spin shaft 78 (support shaft) of the primer-coating device 65 described with reference to FIG. 21, and is not described here again in detail.

In the photochromic-coating device 66 as shown in FIG. 15, the nozzle 89a of the barrel 89 is arranged on the central portion of the lens 10 (second intermediate product lens), and a flexible film 91 comprising a plastic film such as PET film for spreading the coating solution is moved straight from the central portion of the lens 10 to the outer circumferential portion 10b thereof to spread the coating solution. The moving position of the film 90 from the central portion of the lens 10 to the outer circumferential portion 10b thereof is determined depending upon the outer diameter, height and curvature of the lens measured by the lens-measuring device 48. Here, it is desired to provide plate-like spatulas 91a on the side surfaces of the lens 10 to prevent the adhesion of the photochromic coating solution.

During the photochromic-coating operation, it is desired that the end (lower end) of nozzle 89a of the barrel 89 is positioned in a range of not larger than 2.5 mm and, particularly, 1±0.2 mm from the surface at the central portion of the lens 10. The reason is as described below.

To drip the coating solution in a predetermined amount within a predetermined period of time through a nozzle of a small diameter, the blow-out rate (linear velocity) of the coating solution becomes inevitably greater than that of when a nozzle of a large diameter is used. If the linear velocity is increased, however, bubbles much evolve in the formed coating. Though not theoretically definite, the cause is attributed to that as the liquid droplets blown out from the nozzle fall down, the leading ends of the droplets are dented due to the pressure of the atmosphere and trap bubbles therein. Even after the droplets have arrived at the surface of the base member, therefore, it is probable that bubbles remain trapped in the coating solution.

In particular, if the solution has a high viscosity like the photochromic coating solution, bubbles are trapped much when the droplets are blown out. The bubbles have a size of about 10 µm and can be seen even by naked eyes. Therefore, if bubbles infiltrate into the photochromic coating of the spectacle lenses, then their commercial value is very impaired.

Therefore, the gap between the nozzle 89a of the barrel 89 and the surface at the central portion of the lens 10 must be within the above range and, particularly, 1±0.2 mm.

Referring to FIG. 15, the barrel 89 is supported by a support member 92, and is renewed when the photochromic coating solution is depleted. At this moment, the height of nozzle 89a of the barrel 89 is subject to vary. So far, the height was adjusted by the operator by using a gap gauge after the barrel 89 was renewed, causing a burden on the operator. Besides, it had been desired to improve the precision of gap.

In this embodiment, after the barrel 89 is renewed, the height-measuring sensors 90a and 90b are arranged in the photochromic-coating portion 7 as shown in FIG. 15, and the barrel 89 is moved up and down by means (not shown) for moving the barrel 89 to measure the height of the end of the barrel 89. The height at the central portion of the lens 10 has been known since it has been measured by the lens-measuring device 48. Therefore, the barrel 89 is so arranged that the end of nozzle 89a of the barrel 89 assumes a predetermined height with respect to the central portion of the lens 10. The height of the spin shaft 85 of the photochromic-coating device 66 remains unchanged.

It is desired to adjust the temperature to lie from 20 to 23° C. in the photochromic-coating portion 7. With the temperature being adjusted to lie in this range, the photochromic-coating operation can be stably carried out. The temperature in the photochromic-coating portion 7 is adjusted by adjusting the air to be fed thereto through the temperature-adjusting facility 127, and pressure-feeding the air thereto by using the air-feed pump (pressure-feeding device) 129. The adjusted air is fed from the intake duct 20b into the photochromic-coating portion 7 through the HEPA filter 19b, and the temperature is set to lie in the above-mentioned range. Upon adjusting the temperature in the photochromic-coating portion 7 to lie in the above range, the viscosity of the photochromic coating solution can be easily adjusted to minimize the occurrence of defective products which become the cause of defective photochromic coating. If the temperature lies outside the above temperature range, about 50% of the products may often become defective.

Upon adjusting the temperature in the photochromic-coating portion 7, the occurrence of defective products can be further decreased. FIG. 24 illustrates that the air fed to the intake duct 20b connected to the photochromic-coating portion 7 has been adjusted in the same manner as the air fed to the intake duct 20a connected to the primer-coating portion 5. This embodiment makes it possible to share the temperature-adjusting facility 127. Further, within a range of humidity in the primer-coating portion 5, the photochromic-coating processing is not adversely affected. Therefore, the embodiment shown in FIG. 24 makes it possible to share the pressure-feeding device 129 for pressure-feeding the air.

In this embodiment, the air is fed from the intake duct 20b to the photochromic-coating portion 7. The photochromic-coating portion 7 does not have to be air-tight but may be such that the interior thereof can be adjusted to lie within the preset temperature range. The adjusted air that is taken in is exhausted through the gaps of the photochromic-coating portion 7 and through the exhaust facility arranged in the photochromic-coating portion 7. Therefore, no air flows into the photochromic-coating portion 7 from the interior of the apparatus body 1a, and cleanness is maintained. In the photochromic-coating portion 7, therefore, the operation is carried out under the conditions favorable for the photochromic-coating operation.

After the photochromic coating solution has been applied to the lens 10, the shutter 14 moves up, the opening 13a for carry is opened, and the lens 10 (third intermediate product lens) is handed over to the adsorbing portion 64a of the hand-over hand 64 in the same manner as handing over the primer-coated lens 10 but according to a procedure reverse to that of FIGS. 21A to 21D. Next, as shown in FIG. 1, the lens 10 is once placed on the third intermediate product lens temporary-placing portion 74 by the first main carrier means 62. Pins 74a are upstanded on the temporary-placing portion 74. The upstand pins 79a have the same shape as the upstand pins 58d shown in FIG. 14. The third intermediate product lens temporary-placing portion 74 is provided because of the reason that the lens 10 that is supported at its central portion cannot be handed from the adsorbing portion 64a of the first main carrier means 62 over to the adsorbing portion 69a of the second main carrier means 67. Therefore, the third intermediate product lens temporary-placing portion 74 is provided, and the bottom surface of the lens 10 is supported at the third intermediate product lens temporary-placing portion 74 (the same also holds true for a product lens temporary-placing portion 72 that will be described later). The third intermediate product lens temporary-placing portion 74 may or may not have a lift mechanism.

The photochromic-coating portion 7 can be continuously operated by providing the above third intermediate product lens temporary-placing portion 74 and by using two UV devices. The four pins upstanded at the third intermediate product lens temporary-placing portion 74 correspond to the lens-placing portion on where the third intermediate product lens is to be temporary-placed at the time of handing the third intermediate product lens from the first main carrier means 62 over to the second main carrier means 67.

At the third intermediate product lens temporary-placing portion 74, the second main carrier means 67 receives the lens 10 (third intermediate product lens). Thereafter, the lens 10 is carried to either the UV device 70 or 71 to cure the photochromic coating. In order for the second main carrier means 67 to receive the lens 10 from the temporary-placing portion 74, the adsorbing portion 69a is arranged under the lower surface of the center of the lens 10, and the upstand pins 74a of the temporary-placing portion 74 are moved up and down, or the adsorbing portion 69a is moved up and down. In the UV devices 70, 71, ultraviolet rays are irradiated from the UV lamps to cure the coating on the lens 10. The UV devices 70 and 71 are constituted in the same manner, and either one UV device 70 will be described below.

In a UV unit 8a, the lens 10 is carried by the second main carrier means 67 to the UV device 70. A stage 97 moves down by the operation of an air cylinder 121 in the stage lift unit 120, and the lens 10 is carried by the hand-over hand 69 to the spin shaft 97a. After the lens 10 is supported by the spin shaft 97a, the stage 97 moves up and the lens 10 is held in the lens-holding chamber 96.

The procedure for handing the lens 10 over to the spin shaft 97a (support shaft) is basically the same as the procedure for handing the lens 10 from the adsorbing portion 64a over to the spin shaft 78 (support shaft) of the primer-coating device 65 and to the spin shaft 85 (support shaft) of the photochromic-coating device 66. In order to cure the lens 10 with the UV ray in the nitrogen-purged lens-holding chamber 96, as will be described below, however, it is desired that the pins 115 upstanded on the lens-support plate 114 are moved from the lower side of the lens 10 in a state shown in FIG. 16 to the exterior of the lens-holding chamber 96 (so will not to be present in the lens-holding chamber 96). Concretely as shown in FIG. 16, the lens-support plate 114 having four pins 115 upstanded on the upper surface thereof is not only moved up and down but also moved in a horizontal direction by an air cylinder 114a for turning. After the lens 10 is supported on the spin shaft 97a (support shaft), the lens-support plate 114 is moved in the horizontal direction, and the upstand pins 115 are moved together with the lens-support plate 114 from the upper part of the stage 97. Thereafter, the stage 97 is moved up to hold the lens 10 in the lens-holding chamber 96. This makes it possible to decrease the size of the lens-holding chamber 96.

Thereafter, the interior of the lens-holding chamber 96 is purged with nitrogen. A nitrogen atmosphere is employed. This is because oxygen impairs the polymerization reaction of the coating solution; i.e., the coating solution cures little. $N_2$ is maintained supplied to the lens-holding chamber 96 from when the interior of the lens-holding chamber 96 start being purged until when the curing of the coating is completed with the UV ray in order to prevent an increase in the oxygen concentration in the lens-holding chamber 96.

While the UV is being irradiated, an ultraviolet ray irradiation chamber 93 and the UV device 70 are heated by the heat of the UV lamp 95. Here, however, an exhaust duct 93c has been connected to the ultraviolet ray irradiation chamber 93. Since forced exhaust means that is not shown has been connected to the exhaust duct 93c, the hot air in the ultraviolet ray irradiation chamber 93 is exhausted to the exterior through the exhaust duct 93c. This suppresses an increase in the temperature in the ultraviolet ray irradiation chamber 93, suppresses an increase in the temperature in the chamber of the coating apparatus 1, and suppresses the effect of an increased temperature in the primer-coating portion 5 and in the photochromic-coating portion 7 that are particularly susceptible to heat. Thus, the coating operation is executed maintaining high quality.

The UV device 70 cures the coating by the irradiation of the UV lamp 95 while rotating the lens 10 at a position that meets the height of the UV lamp 95. The lens 10 is rotated in order to uniformalize the UV ray while decreasing the liquid pools on the peripheral edge portions of the lens 10.

Thus, in the UV devices 70 and 71, the coating on the lens 10 is cured by the irradiation with ultraviolet rays from the UV lamp 95.

While the UV is being irradiated, the ultraviolet ray irradiation chamber 93 and the UV device 70 are heated by the heat of the UV lamp 95. Here, however, the exhaust duct 93c has been connected to the ultraviolet ray irradiation chamber 93. Since forced exhaust means that is not shown has been connected to the exhaust duct 93c, the hot air in the ultraviolet ray irradiation chamber 93 is exhausted to the exterior through the exhaust duct 93c. This suppresses an increase in the temperature in the ultraviolet ray irradiation chamber 93, suppresses an increase in the temperature in the chamber of the coating apparatus 1, and suppresses the effect of an increased temperature in the primer-coating portion 5 and in the photochromic-coating portion 7 that are particularly susceptible to heat. Thus, the coated lens having high quality is obtained.

After the coating has been cured, the lens 10 (product lens) is handed over to the adsorbing portion 69a of the second main carrier means 67 by the same method of handing over the primer-coated lens 10 and the photochromic-coated lens 10, i.e., by the procedure reverse to that of FIGS. 21A to 21D, but lowering the stage 97, moving the lens-support plate 114 in the horizontal direction, and disposing the upstand pins 115 (lens-placing portion) under the lens 10. Here, the method of handing the lens 10 over onto the upstand pins 72a of the product lens temporary-placing portion 72 is the same as the method of handing the lens 10 over onto the upstand pins 74a of the third intermediate product lens temporary-placing portion 74, and is not described here again.

The lens 10 (product lens) on the upstand pins 72a of the product lens temporary-placing portion 72 is received by the second lens sub-carrier means 73 of the product lens storage portion 9. In the second lens sub-carrier means 73, the lens 10 is supported by the lens-adsorbing portion 45c of the lens-support unit 45 for sub-carrier means according to a procedure shown in FIGS. 19C, 19B and 19A. That is, the lens-support unit 45 for sub-carrier means is passed between the upstand pins 72a. Thereafter, the lens-adsorbing portion 45c is disposed just under the center of the lens 10 and is moved up to thereby support the lens 10. After having supported the lens 10, the lens-support unit 45 for sub-carrier means places the lens 10 on the product lens-holding units 75, 75 according to a procedure reverse to that of the above-mentioned first lens sub-carrier means 31. The pins upstanded at the product lens temporary-placing portion 72 correspond to the lens-placing portion on where the product lens is to be temporary-placed at the time of handing the lens 10 (product lens) from the second main carrier means 67 over to the second lens sub-carrier means 73.

Figure 26:
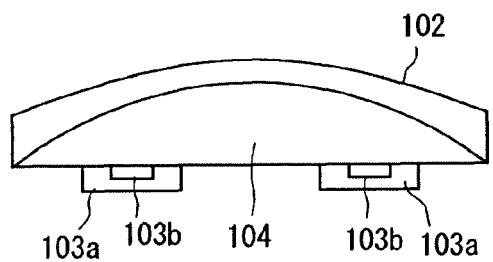
[FIG. 26] is a sectional view illustrating a state where the hand-over hand of FIG. 25C is supporting the lens.
Figure 27:
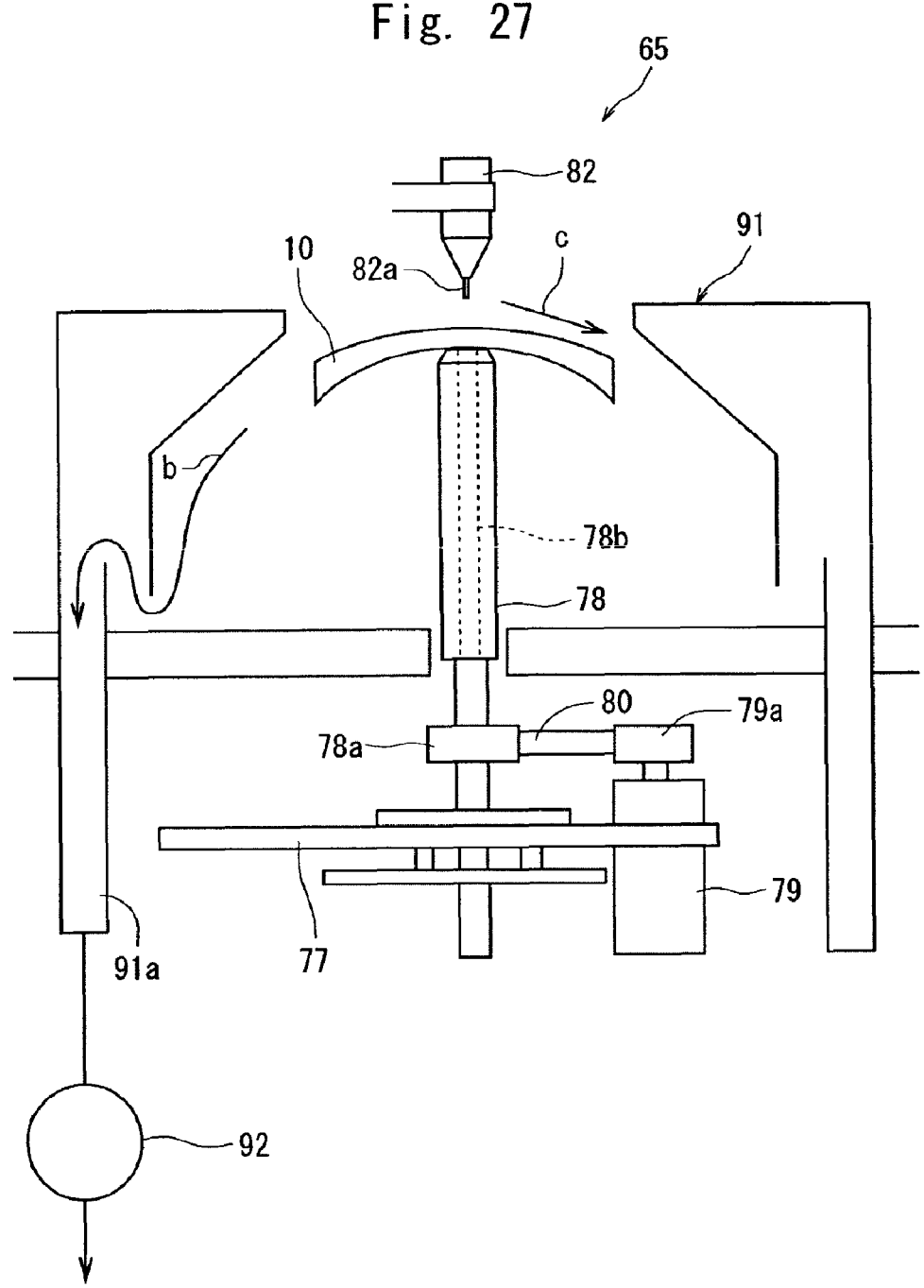
[FIG. 27] illustrates a primer-coating device provided with a cover for exhausting the mist in the primer-coating portion according to the prior art.

When the lens 10 is moved in the horizontal direction according to the embodiment as described above, the lens-adsorbing portions 45c, 64a, 69a support the central portion of the lens 10 by suction instead of supporting the outer circumferential portion of the lens that is done by the prior art. Therefore, the lens is prevented from being distorted since no moment is exerted thereon, and the pad (see reference numeral 104 in FIG. 26) can be omitted. Here, however, the coating device of the invention is capable of handling the lens with a pad on the bottom surface thereof, as a matter of course.

The pins 58d, 81d, 6a, 88d, 74a and 72a upstanded at a place where the lens 10 is to be handed over, are allowed to move up and down or remain stationary, but do not move in a horizontal direction. Therefore, there is no probability that the center of the lens 10 is deviated. However, only those upstand pins 115 used in the UV devices 70, 71 are caused to move horizontally to realize the device in a compact size. The numbers of the upstand pins 58d, 81d, 6a, 88d, 74a, 72a and 115 are arbitrary if the lens 10 can be supported. To stably place the lens 10, however, it is desired that the number of the pins is three or more and, more desirably, four.

In this embodiment, further, the primer-coating operation can be conducted in a favorable environment without affected by the temperature of the UV irradiation portions 8a and 8b since the primer-coating portion 5 is sectionalized and, besides, owing to the provision of the temperature-adjusting facility 127 for adjusting the temperature of the air and of the humidity-adjusting facility 128 for adjusting the humidity. Similarly, the photochromic-coating operation can also be conducted in a favorable environment without affected by the temperature of the UV irradiation portions 8a and 8b since the photochromic-coating portion 7 is sectionalized and, besides, owing to the provision of the temperature-adjusting facility 127 for adjusting the temperature of the air.

In this embodiment, further, the primer-coating portion 5 is sectionalized; i.e., a harmful influence stemming from a negative pressure created by the suction pump is offset by feeding the air into the primer-coating portion 5 through the intake duct 20a making it possible to prevent the infiltration of dust from the exterior. Similarly, the air is fed into the photochromic-coating portion 7, too, through the intake duct 20b. Upon elevating the pressure in the chambers of the coating portions 5 and 7, therefore, a coated lens of high quality is obtained without the need of enhancing the cleanness in the place where the coating apparatus 1 is installed.

In this embodiment, the temperature-adjusting facility 127, humidity-adjusting facility 128 and air-feed pump 129 are shared by the photochromic-coating portion 7 and the primer-coating portion 5, and the air sucked through the intake ducts 20a and 20b has the same temperature and humidity conditions. This is to simplify the structures of the devices as described above, by conducting the photochromic-coating operation that is not much affected by the humidity in the same humidity environment that is suited for conducting the primer-coating operation. Here, however, the intake duct 20a of the primer-coating portion 5 may be separate from the intake duct 20b of the photochromic-coating portion 20b, and the temperatures and humidities may be separately set to suit for the individual coating operations.

Though the invention was described above by way of the embodiment, it should be noted that the invention can be variously modified or varied without departing from the technical spirit of the invention, as a matter of course.

In the above embodiment, for example, the lens 10 is handed over by fixing the height of the spin shafts 78, 85 (support shafts). However, the lens 10 can be handed over by moving the spin shafts 78, 85 (support shafts) up and down.

The invention claimed is:

1. An apparatus for coating lenses comprising a coating line which includes a lens-measuring portion (3) for measuring the shape of a starting lens, a primer-coating portion (5) for applying a primer solution onto the starting lens to prepare a first intermediate product lens having an undried primer coating, a photochromic-coating portion (7) for applying a photochromic coating solution onto a second intermediate product lens obtained by drying said first intermediate product lens through a drying portion (6) to prepare a third intermediate product lens having an uncured photochromic coating, and a UV irradiation portion (8) for irradiating the third intermediate product lens with UV to cure the uncured photochromic coating to thereby prepare a product lens; and carrier means for carrying the lens to each of the portions in said coating line; wherein, means for supporting the lens in at least any one of said lens-measuring portion (3), primer-coating portion (5), photochromic-coating portion (7) or UV irradiation portion (8), is a support shaft for supporting the central bottom surface portion of the lens by air suction means;

said carrier means is provided with an adsorbing portion for supporting the central bottom surface portion of the lens by the air suction means, and said support shaft is surrounded by a lens-placing portion for supporting the bottom surface of the lens other than the regions of the lens that are supported by said support shaft and by said adsorbing portion; and the lens is temporary-placed on said lens-placing portion at the time of receiving or handing over the lens between said support shaft and said adsorbing portion, and at least any one of said lens-placing portion, support shaft or adsorbing portion is moved up and down so that said lens is supported by said support shaft or by said adsorbing portion.

2. The apparatus for coating lenses according to claim 1, wherein said lens-placing portion comprises three or more pin members upstanded surrounding said support shaft, and the bottom surface of the lens is supported by the ends of said three or more pin members.

3. The apparatus for coating lenses according to claim 1, wherein the height of said support shaft is fixed, and said lens-placing portion and said adsorbing portion are moved up and down to receive or hand over said lens.

4. The apparatus for coating lenses according to claim 1, wherein said carrier means are provided in a number of two or more, and the lens-placing portion is provided for temporary-placing the lens thereon at the time when the lens is to be received or handed over among these carrier means, and said lens-placing portion supports the bottom surface of the lens other than the region of the lens supported by said adsorbing portion of said carrier means.

5. The apparatus for coating lenses according to claim 1, wherein said carrier means is provided with two adsorbing portions, the one adsorbing portion receiving the lens supported by said support shaft via said lens-placing portion and the other adsorbing portion handing the lens supported by said adsorbing portion over to said support shaft.

6. The coating apparatus according to claim 1, wherein said lens-measuring portion (3) is provided with a lens-measuring sensor for detecting the height of the central portion of the lens, said photochromic-coating portion is provided with a sensor for detecting the height of the end of a nozzle of a container that feeds the photochromic coating solution, and the distance between the end of said nozzle and the central portion of the lens is adjustable to a predetermined gap.

7. The apparatus for coating lenses according to claim 1, wherein:
   said UV irradiation portion (8) is provided with the support shaft for supporting the central bottom surface portion of the third intermediate product lens by the air suction means, and a lens-holding chamber (96) that can be purged with nitrogen for irradiating the third intermediate product supported by said support shaft with ultraviolet rays;
   the carrier means for conveying the lens to said UV irradiation portion (8) is provided with the adsorbing portion for supporting the central bottom surface portion of the lens by the air suction means;
   said support shaft is surrounded by the lens-placing portion that supports the bottom surface of the lens other than the region of the lens supported by said support shaft and by said adsorbing portion; and
   at the time of receiving or handing over the lens between said support shaft and said adsorbing portion, the lens is temporary-placed on said lens-placing portion, at least anyone of said lens-placing portion, support shaft or adsorbing portion is moved up and down so that said lens is supported by said support shaft or by said adsorbing portion, and after said lens is supported by said support shaft, said lens-placing portion is moved in a horizontal direction from under the lens and is arranged being separated away from said lens-holding chamber.

8. The apparatus for coating lenses according to claim 1, wherein:
   said primer-coating portion (5) is provided with said support shaft and said lens-placing portion, includes an intake duct (134) having an intake port for taking in the primer coating solution in the form of liquid or mist scattered at the time of coating, and has an adhesion-preventing member for preventing the primer coating solution from adhering on said lens-placing portion;
   said intake duct (134) includes an upper cup (131) near the circumferential edge of the lens having a center opening (131a) at a position higher than the lens, and a middle cup (132) near the circumferential edge of the lens having a center opening (132a) at a position lower than the lens and maintaining a distance from said upper cup, said intake duct (134) having a exhaust port for exhausting the primer coating solution in the form of liquid or mist to the exterior;
   the intake port of said intake duct (134) is formed by the center opening (131a) of said upper Cup (131) and by the center opening (132a) of said middle cup (132); and
   said adhesion-preventing member has an upper end near the circumferential edge of said center opening (132a) of said middle cup (132), and includes a cylindrical member which surrounds at least the upper end side of said lens-placing portion.

9. The apparatus for coating lenses according to claim 1, wherein a starting lens-feeding portion (2) is arranged at a position upstream of said coating line, said starting lens-feeding portion (2) having:
   starting lens-holding units (22) in which a plurality of starting lenses are arranged straight in the horizontal direction and/or in the up-and-down direction;
   a lens-adsorbing portion (45c) for supporting the bottom surface of said starting lens held in said starting lens-holding units by the suction of the air;
   a moving mechanism for moving said lens-adsorbing portion (45c) back and forth, right and left, and up and down; and
   a first lens sub-carrier means (31) for carrying the starting lenses from the starting lens-holding units (22) to said lens-measuring portion (3).

10. The apparatus for coating lenses according to claim 9, wherein said starting lens-holding unit (22) has, formed therein, a plurality of stepped starting lens-placing portions (25) in concentric having diameters increasing upward, an open portion is formed in the central portions of said plurality of starting lens-placing portions and in a portion of said lens-placing portion on the side of said first lens sub-carrier means (31) enabling said lens-adsorbing portion (45c) to pass through, and the lens is placed on said stepped portion.

11. The apparatus for coating lenses according to claim 1, wherein a product lens storage portion (9) is arranged at a position downstream of said coating line, said product lens storage portion (9) having:
   product lens-holding units (75) in which a plurality of product lenses are arranged straight in the horizontal direction and/or in the up-and-down direction;
   a lens-adsorbing portion (45c) for supporting the bottom surface of the product lens by the suction of the air;
   a moving mechanism for moving said lens-adsorbing portion (45c) back and forth, right and left, and up and down; and
   a second lens means (73) for carrying the product lenses from said coating line to said product lens-holding units (75).

12. The apparatus for coating lenses according to claim 11, wherein said product lens-holding unit (75) has, formed therein, a plurality of stepped product lens-placing portions (75a) in concentric having diameters increasing upward, an open portion is formed in the central portions of said plurality of product lens-placing portions and in a portion of said lens-placing portion on the side of said second lens sub-carrier means (73) enabling said lens-adsorbing portion (45c) to pass through, and the lens is placed on said stepped portion.

13. The apparatus for coating lenses according to claim 1, wherein said photochromic-coating portion (7) is partitioned, and temperature-adjusting means is provided therein to adjust the temperature in said photochromic-coating portion (7).

14. The apparatus for coating lenses according to claim 1, wherein said primer-coating portion (5) is partitioned, and temperature-adjusting means and humidity-adjusting means are provided therein to adjust the temperature and humidity in said primer-coating portion (5).

15. The apparatus for coating lenses according to claim 1, wherein said UV irradiation portion (8) is partitioned, and an exhaust duct (93*c*) is provided therein to exhaust the air in said UV irradiation portion (8) to the exterior of said apparatus body.

16. The apparatus for coating lenses according to claim 1, wherein said primer-coating portion (5) and said photochromic-coating portion (7) are provided with intake ducts (20*a*, 20*b*) which are arranged via filters (19*a*, 19*b*).

* * * * *